US012001805B2

(12) United States Patent
Srinivasan et al.

(10) Patent No.: US 12,001,805 B2
(45) Date of Patent: Jun. 4, 2024

(54) EXPLAINABLE NATURAL LANGUAGE UNDERSTANDING PLATFORM

(71) Applicants: Venkatesan Srinivasan, Weston, MA (US); Vishaal Jatav, Kharadi Wagholi Pune (IN)

(72) Inventors: Venkatesan Srinivasan, Weston, MA (US); Vishaal Jatav, Kharadi Wagholi Pune (IN)

(73) Assignee: GYAN INC., MA (US)

( * ) Notice: Subject to any disclaimer, the term of this patent is extended or adjusted under 35 U.S.C. 154(b) by 0 days.

(21) Appl. No.: 18/306,479

(22) Filed: Apr. 25, 2023

(65) Prior Publication Data

US 2023/0359834 A1 Nov. 9, 2023

Related U.S. Application Data

(60) Provisional application No. 63/497,731, filed on Apr. 23, 2023, provisional application No. 63/334,340, filed on Apr. 25, 2022.

(51) Int. Cl.
*G06F 40/30* (2020.01)
*G06F 40/205* (2020.01)
*G06F 40/35* (2020.01)

(52) U.S. Cl.
CPC ............ *G06F 40/35* (2020.01); *G06F 40/205* (2020.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS

| 5,495,605 A * | 2/1996 | Cadot .............. G06F 16/24537 |
| 7,152,031 B1 * | 12/2006 | Jensen ............... G06F 16/3344 707/999.005 |
| 7,359,860 B1 * | 4/2008 | Miller ..................... G10L 15/22 379/88.05 |
| 7,551,552 B2 * | 6/2009 | Dunagan ................. H04L 45/02 370/242 |
| 7,840,556 B1 * | 11/2010 | Dayal ................. G06F 16/2453 707/999.003 |
| 9,292,490 B2 * | 3/2016 | Kimelfeld ............. G06F 40/289 |

(Continued)

*Primary Examiner* — Lamont M Spooner

(57) ABSTRACT

A system and method for a real time, human-analogous natural language understanding engine (NLU Platform). The Platform understands natural language content in its full compositional context, is completely explainable and is effective with no or little training data. The invention utilizes a machine representation of natural language to enable human-analogous understanding by machines. The invention combines knowledge-based linguistics, discourse models, compositionality and the rhetorical structure in language. It can incorporate global knowledge about a concept to improve its representation and understanding. The platform does not rely on statistically derived distributional semantics and can be used for the complete range of natural language understanding tasks in the world. In one exemplary application, the NLU Platform can be used for automated knowledge acquisition or as an automated research engine for any topic or set of topics from one or more document repositories like the internet.

60 Claims, 24 Drawing Sheets

(56) References Cited

U.S. PATENT DOCUMENTS

| Patent/Pub. No. | Date | Inventor | Class |
|---|---|---|---|
| 9,582,501 B1* | 2/2017 | Salmon | G06F 40/30 |
| 9,811,579 B1* | 11/2017 | Olson | G06F 16/86 |
| 9,817,721 B1* | 11/2017 | Youngworth | G06F 11/2094 |
| 10,175,865 B2* | 1/2019 | Beaver | G06F 40/30 |
| 10,289,974 B1* | 5/2019 | Ouimette | G06F 3/048 |
| 10,545,648 B2* | 1/2020 | Beaver | G06F 3/04842 |
| 11,023,684 B1* | 6/2021 | Flor | G06F 40/253 |
| 11,669,556 B1* | 6/2023 | Hasan | G06F 16/9024 707/736 |
| 2001/0007987 A1* | 7/2001 | Igata | G06F 16/93 |
| 2002/0040292 A1* | 4/2002 | Marcu | G06F 40/253 704/7 |
| 2002/0046018 A1* | 4/2002 | Marcu | G06F 40/44 704/9 |
| 2002/0078255 A1* | 6/2002 | Narayan | H04L 69/329 719/330 |
| 2003/0138758 A1* | 7/2003 | Burstein | G09B 11/00 434/167 |
| 2003/0217335 A1* | 11/2003 | Chung | G06F 40/30 707/E17.084 |
| 2004/0044519 A1* | 3/2004 | Polanyi | G06F 40/35 707/E17.058 |
| 2005/0086592 A1* | 4/2005 | Polanyi | G06F 40/35 707/E17.094 |
| 2006/0184516 A1* | 8/2006 | Ellis | G06F 16/9538 |
| 2007/0073533 A1* | 3/2007 | Thione | G06F 40/35 704/9 |
| 2007/0136284 A1* | 6/2007 | Cobb | G06F 40/131 |
| 2007/0192306 A1* | 8/2007 | Papakonstantinou | G06F 16/951 707/999.005 |
| 2008/0228467 A1* | 9/2008 | Womack | G06F 40/30 704/9 |
| 2009/0100053 A1* | 4/2009 | Boschee | G06F 16/334 |
| 2009/0248399 A1* | 10/2009 | Au | G06F 40/237 704/9 |
| 2009/0327878 A1* | 12/2009 | Grandison | G06F 16/345 715/256 |
| 2010/0169359 A1* | 7/2010 | Barrett | G06F 16/313 707/769 |
| 2011/0119049 A1* | 5/2011 | Ylonen | G06F 40/211 704/9 |
| 2011/0153673 A1* | 6/2011 | Boschee | G06F 16/334 707/E17.098 |
| 2011/0184718 A1* | 7/2011 | Chen | G06F 40/55 704/9 |
| 2012/0246578 A1* | 9/2012 | Baldwin | G06F 3/0484 715/753 |
| 2013/0046757 A1* | 2/2013 | Salvetti | G06F 16/957 707/723 |
| 2013/0138696 A1* | 5/2013 | Turdakov | G06F 16/367 707/794 |
| 2013/0151347 A1* | 6/2013 | Baldwin | G06Q 50/01 715/810 |
| 2013/0204611 A1* | 8/2013 | Tsuchida | G06F 40/40 704/9 |
| 2014/0136188 A1* | 5/2014 | Wroczynski | G06F 40/284 704/9 |
| 2015/0039295 A1* | 2/2015 | Soschen | G06F 40/205 704/9 |
| 2015/0046492 A1* | 2/2015 | Balachandran | G06F 8/36 707/772 |
| 2015/0134325 A1* | 5/2015 | Skiba | H04M 3/5233 704/9 |
| 2015/0149461 A1* | 5/2015 | Aguilar Lemarroy | G06F 16/35 707/737 |
| 2015/0161512 A1* | 6/2015 | Byron | G06F 16/24578 706/12 |
| 2016/0034457 A1* | 2/2016 | Bradley | G06F 16/24578 707/749 |
| 2016/0071517 A1* | 3/2016 | Beaver | G06F 16/35 704/9 |
| 2016/0085743 A1* | 3/2016 | Haley | G06F 40/40 704/9 |
| 2016/0179775 A1* | 6/2016 | Desai | G06F 40/284 707/739 |
| 2016/0232152 A1* | 8/2016 | Mahamood | G06F 40/186 |
| 2016/0246779 A1* | 8/2016 | Ho | G06F 40/30 |
| 2016/0247068 A1* | 8/2016 | Lin | G06F 40/40 |
| 2016/0283491 A1* | 9/2016 | Lu | G06F 16/3322 |
| 2016/0328667 A1* | 11/2016 | Macciola | G06V 30/40 |
| 2017/0032053 A1* | 2/2017 | LeTourneau | G06F 16/322 |
| 2017/0104829 A1* | 4/2017 | Degroat | H04L 47/82 |
| 2017/0177675 A1* | 6/2017 | Beller | G06N 3/004 |
| 2017/0228368 A1* | 8/2017 | Carter | G06N 5/022 |
| 2017/0277993 A1* | 9/2017 | Beaver | G06Q 30/0201 |
| 2018/0121062 A1* | 5/2018 | Beaver | G06F 40/30 |
| 2018/0181648 A1* | 6/2018 | Chen | G06F 16/951 |
| 2018/0189385 A1* | 7/2018 | Sun | G06F 40/30 |
| 2018/0260472 A1* | 9/2018 | Kelsey | G06F 40/56 |
| 2018/0314689 A1* | 11/2018 | Wang | G10L 15/1822 |
| 2019/0012405 A1* | 1/2019 | Contractor | G06F 16/248 |
| 2019/0033957 A1* | 1/2019 | Shionozaki | G06F 16/00 |
| 2019/0138190 A1* | 5/2019 | Beaver | G06F 40/35 |
| 2019/0272324 A1* | 9/2019 | Esposito | G06F 40/284 |
| 2019/0317999 A1* | 10/2019 | McNeillie | G06F 16/345 |
| 2019/0377605 A1* | 12/2019 | Joseph | G06F 9/5027 |
| 2020/0099790 A1* | 3/2020 | Ma | G06N 3/08 |
| 2020/0117858 A1* | 4/2020 | Freeman | G06F 40/117 |
| 2020/0133933 A1* | 4/2020 | Ricard | G06F 16/2282 |
| 2020/0301589 A1* | 9/2020 | Buzzard | G06F 3/0617 |
| 2020/0311542 A1* | 10/2020 | Wang | G06N 3/045 |
| 2021/0020165 A1* | 1/2021 | Scodary | G06N 3/044 |
| 2021/0027799 A1* | 1/2021 | Scodary | G06Q 10/06395 |
| 2021/0029248 A1* | 1/2021 | Scodary | G06F 18/24155 |
| 2021/0034784 A1* | 2/2021 | Baughman | G06N 3/08 |
| 2021/0089620 A1* | 3/2021 | Finkelshtein | G10L 15/19 |
| 2021/0295822 A1* | 9/2021 | Tomkins | G06F 40/289 |
| 2021/0303578 A1* | 9/2021 | Dua | G06F 16/243 |
| 2021/0312304 A1* | 10/2021 | Keena | G06N 20/00 |
| 2022/0076668 A1* | 3/2022 | Carbune | G10L 15/063 |
| 2022/0156298 A1* | 5/2022 | Mahmoud | G06F 16/9535 |
| 2022/0284215 A1* | 9/2022 | Rastogi | G06F 16/9024 |
| 2023/0177257 A1* | 6/2023 | Peleg | G06F 3/04847 715/255 |
| 2023/0229847 A1* | 7/2023 | Rosedale | G06F 40/103 715/243 |
| 2024/0020778 A1* | 1/2024 | Lundberg | G06F 40/166 |

* cited by examiner

Fig. 1
Relevance Analysis of 10 Search Queries using Google

| | | | | | | | | | | Google Page No | | | | | | | | | | | | | |
|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| Relevant | 81 | 70 | 66 | 69 | 65 | 63 | 65 | 59 | 68 | 62 | 67 | 61 | 53 | 44 | 39 | 34 | 26 | 18 | 10 | 15 | 12 | 2 | 2 |
| Irrelevant | 3 | 6 | 9 | 11 | 12 | 16 | 12 | 19 | 14 | 17 | 11 | 21 | 18 | 10 | 23 | 20 | 18 | 19 | 27 | 16 | 13 | 11 | 3 |
| Non-Article | 9 | 21 | 22 | 19 | 19 | 17 | 23 | 19 | 17 | 20 | 18 | 15 | 15 | 27 | 18 | 22 | 25 | 23 | 18 | 12 | 18 | 8 | 0 |
| Total | 93 | 97 | 97 | 99 | 96 | 96 | 100 | 97 | 99 | 99 | 96 | 97 | 86 | 81 | 80 | 76 | 69 | 60 | 55 | 43 | 43 | 21 | 5 |
| Relevant | 87% | 72% | 68% | 70% | 68% | 66% | 65% | 61% | 69% | 63% | 70% | 63% | 62% | 54% | 49% | 45% | 38% | 30% | 18% | 35% | 28% | 10% | 40% |
| Irrelevant | 3% | 6% | 9% | 11% | 13% | 17% | 12% | 20% | 14% | 17% | 11% | 22% | 21% | 12% | 29% | 26% | 26% | 32% | 49% | 37% | 30% | 52% | 60% |
| Non-Article | 10% | 22% | 23% | 19% | 20% | 18% | 23% | 20% | 17% | 20% | 19% | 15% | 17% | 33% | 23% | 29% | 36% | 38% | 33% | 28% | 42% | 38% | 0% |

1785

The NLU Platform High Level Architecture

Expanded Meaning Representation – Layer 2

A Concept Level Meaning Representation Graph where E(ij) = edge with the original text between the ith and jth nodes, R(k) = Abstract rhetorical relation type

Fig. 7
Discourse Models

News Article DM 710

Title
[Summary]
[Section I Title]
    Para 1 Text
        [Enumeration]
    Para 2 Text
    Para m Text
[Section II Title]
    Para m+1 Text
        [Enumeration]
    Para m+2 Text
    Para n Text

Research Article DM 720

Title
Abstract
Section Title, e.g., Introduction
    Para 1 Text
        [Enumeration]
    Para 2 Text
        [Fig/Table]
    Para m Text
Section Title, e.g., Literature Review
    Para m+1 Text
    Para n Text
Section Title, e.g., Analysis & Results
Section Title, e.g., Summary
Section Title, e.g., References

EMail DM 730

To
cc
bcc
Subject
Salutation/Name
Body Para 1
Body Para 2
Signature
[Attachments]

Legal Contract DM 740

Title
Purpose
[Definitions]
Section Title
    Clause 1 Text
        [Sub-clause]
    Clause 2 Text
    Clause m Text
Section Title
    Clause m+1 Text
    Clause n Text
Section Title
Signature Block
[Exhibits] [Appendics]

Fig. 8A
Example Article

[S1] The Salt Lake City School District will do "everything in its lawful power" to protect students' constitutional and legal rights and to ensure schools are not disrupted by immigration enforcement actions, according to a resolution reaffirmed Tuesday by the Salt Lake City Board of Education.

[S2] The board voted to support the 2017 Safe School Resolution, which states the school district cannot and does not inquire about students' immigration status, nor their parents' or guardians' status, as part of the school admissions process.

[S3] The resolution was largely drafted by former board President Heather Bennett, who died in March. The board decided not consider a new resolution but to reaffirm the earlier version to honor Bennett's contributions as its primary author and a board leader.

[S4] The board's action joins local boards of education across the country endorsing like policies in the face of stepped up immigration enforcement nationwide affecting students and families.

[S5] The board also adopted the Resolution for the Protection of Children, which notes the "deep concerns of its constituents about the treatment of migrants and asylum seekers, especially minors at the U.S.-Mexico border."

[S6] It says, in part, that the board recognizes the right of the United States to secure its borders, "but as individuals dedicated to improving the lives of children, the board deplores the use of family separation, which can cause irreparable harm and lifelong trauma to children, as a tool of immigration policy aimed at deterring people seeking safety."

[S7] Board member Nate Salazar said historically, Salt Lake County has been a welcoming community. It is important to continue to celebrate the diversity in Salt Lake schools, which is minority majority with many of those students immigrants and refugees, he said.
"With this current fear I'm hearing about from families and from kids and students and of course our advocacy groups here in Salt Lake, that fear is real, and as kids are coming to school and living at home in that kind of fear, that certainly takes away from the important work of going to school and being present in school and having that opportunity to become educated," Salazar said.

Fig. 8B

[S8] He added: "I truly believe as a school board member our No. 1 priority is our kids. If there's anything we can do as a district or as a board to mitigate fears around this issue then I think we need to do it."

[S9] The vote on the 2017 Safe School Resolution reaffirms the school district's commitment to providing equal opportunity for all students to attend and enjoy opportunities and benefits available in our schools "regardless of ethnicity, race, religion, national origin or immigration status, and to be free from harassment and intimidation."

[S10] The Safe School Resolution states that unless authorities have a search warrant issued by a federal or state judge or magistrate, they will not be granted access to schools for purposes of immigration enforcement, except in rare instances.

[S11] "In very narrow and rare 'exigent circumstances,' which are defined by federal law, the district will legally be required to allow access without a valid search warrant. However, it is extremely unlikely that exigent circumstances will be present while our students are engaged in school activities because exigent circumstances generally involve situations where law enforcement is in hot pursuit of a fleeing criminal suspect or where evidence of a crime is about to be destroyed," the policy states.

[S12] Under district policy, employees are instructed to immediately contact the executive director of policy and legal services if officers attempt to enter school property, attempt to communicate with a student while the student is under district supervision, or the district receives a request for information about students for the purpose of immigration enforcement.

[S13] "No request shall be granted until it has been reviewed by the executive director of Policy and Legal Services," the resolution states.

[S14] Enforcement activities at schools, on transportation routes, on district property or during our school activities, "would significantly disrupt the learning environment and substantially interfere with our students' constitutional rights to be free from unreasonable search and seizures and to access a free public education," the resolution states.

Fig. 8C

[S15] The resolution notes that families have "expressed their concerns about sending their children to school out of fear that deportation will occur while their children are in school, or that immigration officials may involve our schools."

[S16] Amy Dominguez of the activist organization Unidad Inmigrante (Immigrant Unity) thanked the board for it actions. But she urged board members to also create a rapid response team to support students affected by detention, deportation and family separation.

[S17] Dominguez said 1,382 orders of removal have been issued in Utah since July, quoting TRAC Immigration, a comprehensive, independent source for independent and nonpartisan information about federal immigration enforcement.

[S18] "We must recognize the stress this is causes in our immigrant students and recall the practice of family separation is looming in our own great state," Dominguez said.
The Safe School Resolution notes "to date, the district has not had any contact by federal immigration authorities."

[S19] U.S. Immigration and Customs Enforcement characterizes public schools as "sensitive locations," places where, in the normal course of business, immigration enforcement actions should not occur, the resolution states.
However, Dominguez said ICE stations vehicles on school district property after hours or on weekends, she said.

[S20] "We believe this is done is to incite fear among the immigrant community and may prevent students from attending class for fear of removal," Dominguez said.
The school district needs to clarify to the immigrant community that this done without the school district's permission and the district is not collaborating with federal immigration authorities, she said.

[S21] Salazar said the board's actions likely will not "change a lot of hearts and minds on the top federal levels, where these practices are being promoted and executed in many ways. If we can have an impact on our kids here and our families here, that they know their schools, their educators and their district are standing with them side by side, I think that's very valuable. It has a huge impact on the day-to-day quality of life of students and our community."

[S22] Elsewhere in the country, school districts are rolling out plans to protect immigrants' rights on school property.

Fig. 8D

[S23] According to the Detroit Free Press, Detroit Public Schools Community District's new policy says federal enforcement agencies and others will no longer be allowed to enter district property without search warrants and schools will not collect information on students' immigration status.

[S24] Districts in Miami, New York City, Des Moines and Chicago have also adopted policies that say they will not cooperate with federal enforcement officials unless they have a warrant.

Fig. 9A
NLU Platform vs Google Raw Result Comparison for the 10 Sample Queries

| Metric | NLU Engine (N) | Google Raw (H) | Diff (N-H) |
|---|---|---|---|
| P | 88% | 59% | 29% |
| F1 | 89% | 74% | 15% |
| MSE | 1375% | 30168% | -28793% |
| MAE | 12% | 41% | -29% |
| MBE | 1% | 41% | -41% |

NLU Platform vs Google Raw Result Page wise Comparison for the 10 Sample Queries
[Google Page – NLU Page]

Determination of Degree of Relevance of a Document

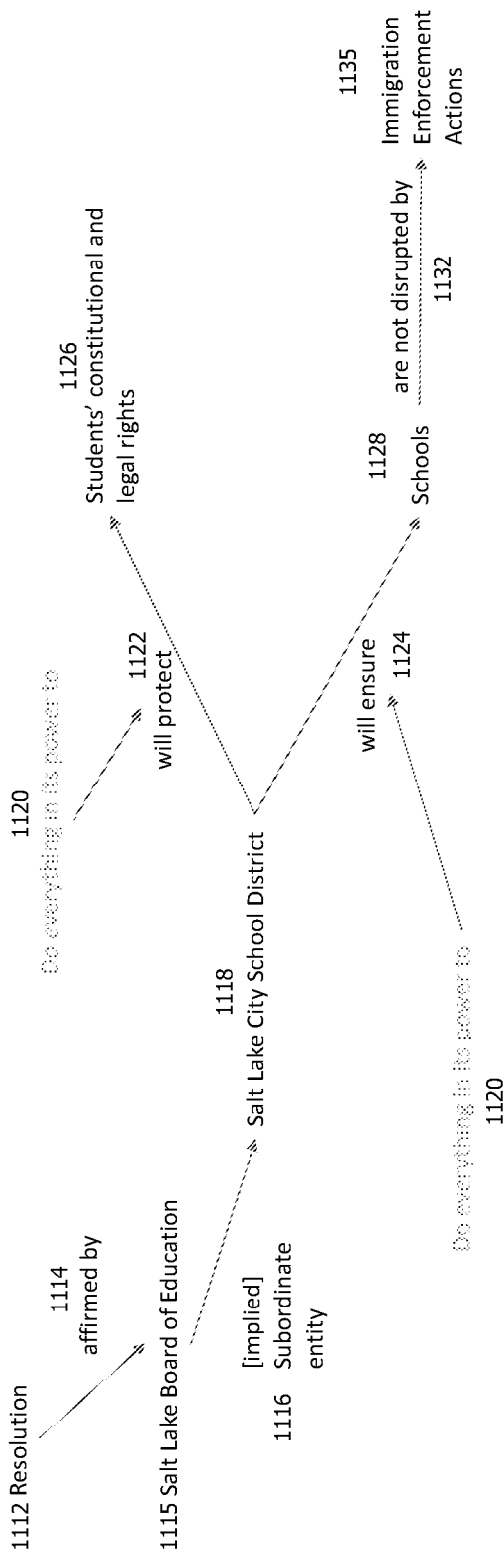

Fig. 12
Document Summary Example

No warrant, no access to schools for immigration enforcement, Salt Lake education board resolves Salt Lake City Board of Education vows the district will do 'everything in its lawful power to protect our students' confidential information'.

The board's action joins local boards of education across the country endorsing like policies in the face of stepped up immigration enforcement nationwide affecting students and families.
Board member Nate Salazar said historically, Salt Lake County has been a welcoming community.

The Safe School Resolution states that unless authorities have a search warrant issued by a federal or state judge or magistrate, they will not be granted access to schools for purposes of immigration enforcement, except in rare instances.

Under district policy, employees are instructed to immediately contact the executive director of policy and legal services if officers attempt to enter school property, attempt to communicate with a student while the student is under district supervision, or the district receives a request for information about students for the purpose of immigration enforcement.

Amy Dominguez of the activist organization Unidad Inmigrante (Immigrant Unity) thanked the board for it actions.

Elsewhere in the country, school districts are rolling out plans to protect immigrants' rights on school property.

Electric Vehicles Knowledge Collection

Fig. 15
Topic Identification Example

| Doc ID | Manually Identified Tags | Gyan Results | |
|---|---|---|---|
| | High Importance Tags | Correctly identified | % Match |
| Doc 1 | 12 | 10 | 83% |
| Doc 2 | 3 | 2 | 67% |
| Doc 3 | 5 | 4 | 80% |
| Doc 4 | 4 | 4 | 100% |
| Doc 5 | 4 | 3 | 75% |
| Doc 6 | 11 | 9 | 82% |
| Doc 7 | 4 | 4 | 100% |
| Grand Total | 43 | 36 | 84% |

Consolidated Meaning Representation Graph for a Knowledge Collection

Fig. 17
Global Knowledge Manual Input

| # Concept 1 | Sense 1 | Relation | Cue Phrase | Direction | Concept 2 | Sense 2 | Scope Type | Scope Details |
|---|---|---|---|---|---|---|---|---|
| American Style | 1 | Same_As | | ANY | Clothing Styles | 1 | Global | Global |
| American Style | 1 | Same_As | | ANY | American Fashion | 1 | Global | Global |
| Baseball | 1 | IS_A_TYPE_OF | | THIS | Sports | 1 | Global | Global |
| Football | 1 | IS_A_TYPE_OF | | THIS | Sports | 1 | Global | Global |
| American religion | 1 | IS_AN_ATTRIBUTE_OF | | THIS | Religion | | | |
| 23% no religious affiliation | 1 | IS_AN_ATTRIBUTE_OF | | THIS | American Religion | 1 | Global | Global |
| Jeans | 1 | IS_A_TYPE_OF | | THIS | Clothing styles | 1 | Global | Global |
| American brands | 1 | IS_AN_ATTRIBUTE_OF | | THIS | American Style | 1 | Global | Global |
| Ralph Lauren | 1 | IS_A_TYPE_OF | | THIS | American brands | 1 | Global | Global |
| fashion sales | 1 | IS_AN_ATTRIBUTE_OF | | THIS | American Fashion | 1 | Global | Global |
| American cuisine | 1 | Same_As | | ANY | American food | 1 | Global | Global |
| Tex-Mex | 1 | IS_A_TYPE_OF | | THIS | American food | 1 | Global | Global |
| American music | 1 | IS_A_TYPE_OF | | THIS | States Arts Culture | 1 | Global | Global |
| Thanksgiving | 1 | IS_A_TYPE_OF | | THIS | American holidays | 1 | Global | Global |
| Growth Rate | 1 | IS_AN_ATTRIBUTE_OF | | THIS | Population | 1 | Global | Global |
| Growth | 1 | IS_AN_ATTRIBUTE_OF | | THIS | Population | 1 | Global | Global |
| Falling | 1 | IS_AN_ATTRIBUTE_OF | | THIS | Growth Rate | 1 | Global | Global |
| Poorest Countries | 1 | IS_AN_ATTRIBUTE_OF | | THIS | Countries | 1 | Global | Global |
| Fastest Growing Populations | 1 | IS_AN_ATTRIBUTE_OF | | THIS | poorest countries | 1 | Global | Global |
| AHA MEMBER SPOTLIGHT | 1 | IS_AN_ATTRIBUTE_OF | | THIS | AHA MEMBER | 1 | document | document |
| AHA MEMBER SPOTLIGHT | 1 | IS_AN_ATTRIBUTE_OF | | THIS | AHA | 1 | document | document |
| Falling Population Size | 1 | IS_AN_ATTRIBUTE_OF | | THIS | Population | 1 | document | document |
| Emigration | 1 | IS_AN_ATTRIBUTE_OF | | THIS | Population | 1 | Global | Global |
| Migratory Outflows | 1 | IS_AN_ATTRIBUTE_OF | | THIS | Population | 1 | Global | Global |
| Fastest Growing Populations | 1 | IS_AN_ATTRIBUTE_OF | | THIS | Population | 1 | Global | Global |
| Social Dissatisfaction | 1 | IS_AN_ATTRIBUTE_OF | | THIS | Estonia Right-Wing Populists Rise | 1 | Global | Global |
| Public Debate | 1 | IS_AN_ATTRIBUTE_OF | | THIS | Estonia | 1 | Global | Global |

Fig. 18
Sense Disambiguation Manual Rules Input

| Concept | Sense | POS Sequence Bef | Cue Phrase | Direction | POS Sequence After | Substance Words | Scope | Classifier |
|---|---|---|---|---|---|---|---|---|
| Rose | 1 | Adj | Color | None | None | garden, vase, bouquet | General | RoseC |
| Rose | 2 | noun | | None | Prep, Article, | Percentage | General | RoseC |
| Rose | 3 | noun | | None | verb, prep, adj | | General | RoseC |

ACL Platform

Figure 20
ACL Platform

| Student | Gyan Scores | Peer Graders Scores | Teaching Assistant Scores [Range] |
|---|---|---|---|
| 1 | 11 | 15 | 8 – 11 |
| 2 | 15 | 15 | 13 – 15 |
| 3 | 15 | 15 | 13 – 14 |
| 4 | 12 | 15 | 11 – 15 |
| 5 | 13 | 15 | 10 – 14 |
| 6 | 14 | 15 | 13 – 15 |
| 7 | 15 | 15 | 10 – 14 |
| 8 | 12 | 15 | 12 – 15 |
| 9 | 13 | 15 | 11 – 13 |
| 10 | 14 | 15 | 13 - 15 |

EXPLAINABLE NATURAL LANGUAGE UNDERSTANDING PLATFORM

REFERENCE TO RELATED APPLICATIONS

This application claims priority to U.S. provisional applications Ser. No. 63/334,340 filed Apr. 25, 2022, and 63/497,731 filed Apr. 23, 2023. The disclosures of which are hereby incorporated by reference as if fully set forth herein.

TECHNICAL FIELD

The present invention relates to natural language understanding, computational linguistics, machine representation of meaning. Specifically to methods, computer programs and systems for human-analogous understanding of natural language data for the full range of automated natural language understanding tasks.

BACKGROUND

Natural language content makes up a large portion of content both on the public internet and in private content repositories. Understandably therefore, there is considerable need and interest in the automated machine processing of natural language content. Almost all the technologies available today for machine processing of natural language rely on large neural language models of word patterns including patterns based on a real-value vector representation of each word. Such approaches are not designed to understand the text in its complete compositional context. Humans understand the text in its full compositional context.

All current language models learn to predict the probability of a sequence of words. The generated sequence of words are related to a query by the user. The next word with the highest probability is selected as the output by the model. These models are trained on very large amounts of raw text. Two categories of statistical methods have been used for building language models—one uses hidden markov models and the other uses neural networks. Both are statistical approaches that rely on large corpus of natural language text (input data) for their prediction. In terms of the input data, the bag of words approach has been very popular. However, a bag of words model while appealing because of its simplicity, does not retain any context and different words have different representations each time regardless of how they are used. This has led to the development of a novel technique called word embeddings in an attempt to create similar representations for similar words. The popular saying, "A word is known by the company it keeps' is the motivation for word embeddings. The proponents of word embeddings believe this is analogous to capturing the semantic meaning of those words and their usage.

Word embeddings suffer from several significant limitations which primarily have to do with the corpus dependent nature of such embeddings and the inability to handle the different senses in which words are used. Learned word representations based on a corpus to determine similar words, is not equivalent to human analogous machine representation of the meaning of the complete text.

Current language models suffer from significant limitations—inability to retain compositional context, lack of explainability and the need for large task-specific data to be combined with the neural language model. Besides, the current crop of language models are far from being universal in their ability to 'learn' or 'transfer' knowledge from one field to the next.

More recently, here has been a trend towards integration of external knowledge into these models to address some of their limitations especially context retention and context-specific global knowledge. While these enhancements improve the performance of language models, they are still based on word level patterns. They have not addressed the fundamental issues of full contextual understanding of the composition, explainability and the need for large scale task-specific data. In the real world, for most natural language processing or understanding tasks, there is often a paucity of large amounts of data.

As an exemplary illustration of the need for natural language understanding by machines, consider a common task most knowledge workers perform routinely—research. It is estimated that there are roughly 1 billion knowledge workers in the world today and growing. Examples of knowledge workers include students, teachers, academic researchers, analysts, consultants, scientists, lawyers, marketers and so on. The research or knowledge acquisition work they perform today involves the use of search engines on the internet and the use of search technologies on internal or private document collections. While search engines have provided immense value in providing access to information where there was no access before, that is just the starting point for research.

Because today's search engines are still unable to fully understand the text inside documents, there are both false positive and false negatives in the result set. Based on the query, irrelevant results can be seen as early as the first page in a display setting of items on a page and most certainly in subsequent pages. Similarly, highly relevant results can be seen listed much later like on pages 10-20.

More importantly, today's technologies provide no assistance in the remaining steps—determine relevance, organize, read, understand and synthesize the knowledge in each document and develop an aggregate understanding across all documents. Current search technologies or language models are incapable of providing automated assistance for the full research or knowledge acquisition process because they are incapable of understanding the complete text in these documents.

There are other exemplary use cases which require full understanding of unstructured content—tagging unstructured content, comparing multiple documents to each other to detect plagiarism or duplicates, and automating the generation of intelligent natural language output. For avoidance of doubt, unstructured content can be videos or audio data which can be transcribed to text.

It is clear therefore that there is a need for a method and system to automate a human-analogous understanding of textual discourse in its full compositional context in an explainable, tractable manner and even in situations where there is sparse data.

SUMMARY OF THE INVENTION

A system and method (NLU Platform) are disclosed for a real time, human-analogous natural language understanding engine. The NLU Platform understands natural language content in its full compositional context, is completely explainable and is effective with no or little training data. The invention discloses a novel method of machine representation of natural language to enable human-analogous understanding by machines. The invention combines knowledge-based linguistics, discourse models, compositionality and the rhetorical structure in language. It incorporates global knowledge about a concept to improve its representation and understanding. The invention does not utilize statistically derived distributional semantics. The invention disclosed is usable for the complete range of natural language understanding tasks that are performed universally.

In one exemplary application, the NLU Platform is used for automated knowledge acquisition or as an automated research engine for any topic or set of topics from one or more document repositories like the internet. This includes determining the degree of relevance for each item, organizing relevant items into a table of contents or automatically deriving a table of contents from its human-analogous understanding of each item, creating a multi-level summary of each relevant item, creating a multi-level semantic meaning graph of each item and identifying the key topics in each item. It synthesizes the content of multiple content items to create a synthesized cross-document multi-level meaning representation and a multi-level synthesized summary across documents. The NLU Platform automatically discovers new knowledge continuously on any aspect of the initially discovered knowledge such as a key topic.

BRIEF DESCRIPTION OF THE DRAWINGS

One or more aspects of the present invention are specifically pointed out and distinctly claimed as examples in the claims at the conclusion of the specification. The foregoing and other objects, features, and advantages of the invention are apparent from the following detailed description in conjunction with the accompanying drawings in which:

FIG. 1 presents the results of an analysis of relevance in 10 search queries using a popular search engine on the internet;

FIG. 7 illustrates several discourse models in accordance with one or more embodiments set forth herein;

FIGS. 8A, 8B, 8C and 8D presents an example news article;

FIGS. 9a and 9B illustrate the determination of the degree of relevance of a document to the topic of interest by the NLU Platform 200;

FIG. 11 illustrates a partial NLU Platform Meaning Representation Graph Concept Layer for the example news article in FIG. 3 in accordance with one or more embodiments set forth herein;

FIG. 12 illustrates an exemplary summary for the document in FIG. 9 created by the NLU Platform 200 in accordance with one or more embodiments set forth herein;

FIG. 15 illustrates the creation of top topics across a collection of documents wherein NLU Platform 200 has combined top topics across multiple documents in accordance with one or more embodiments set forth herein;

FIG. 17 illustrates how the user can input global knowledge for a topic for consideration by the NLU Platform 200 in determining relevance or synopsis in accordance with one or more embodiments set forth herein;

FIG. 18 illustrates how the user can input symbolic rules for identifying specific word sense for different words for consideration by the NLU Platform 200 in accordance with one or more embodiments set forth herein;

FIG. 20 presents the results ACL Platform I of the pilot. As seen, the peer grades were perfect scores for all 10 students.

DETAILED DESCRIPTION OF THE PREFERRED EMBODIMENTS

Figure 2:
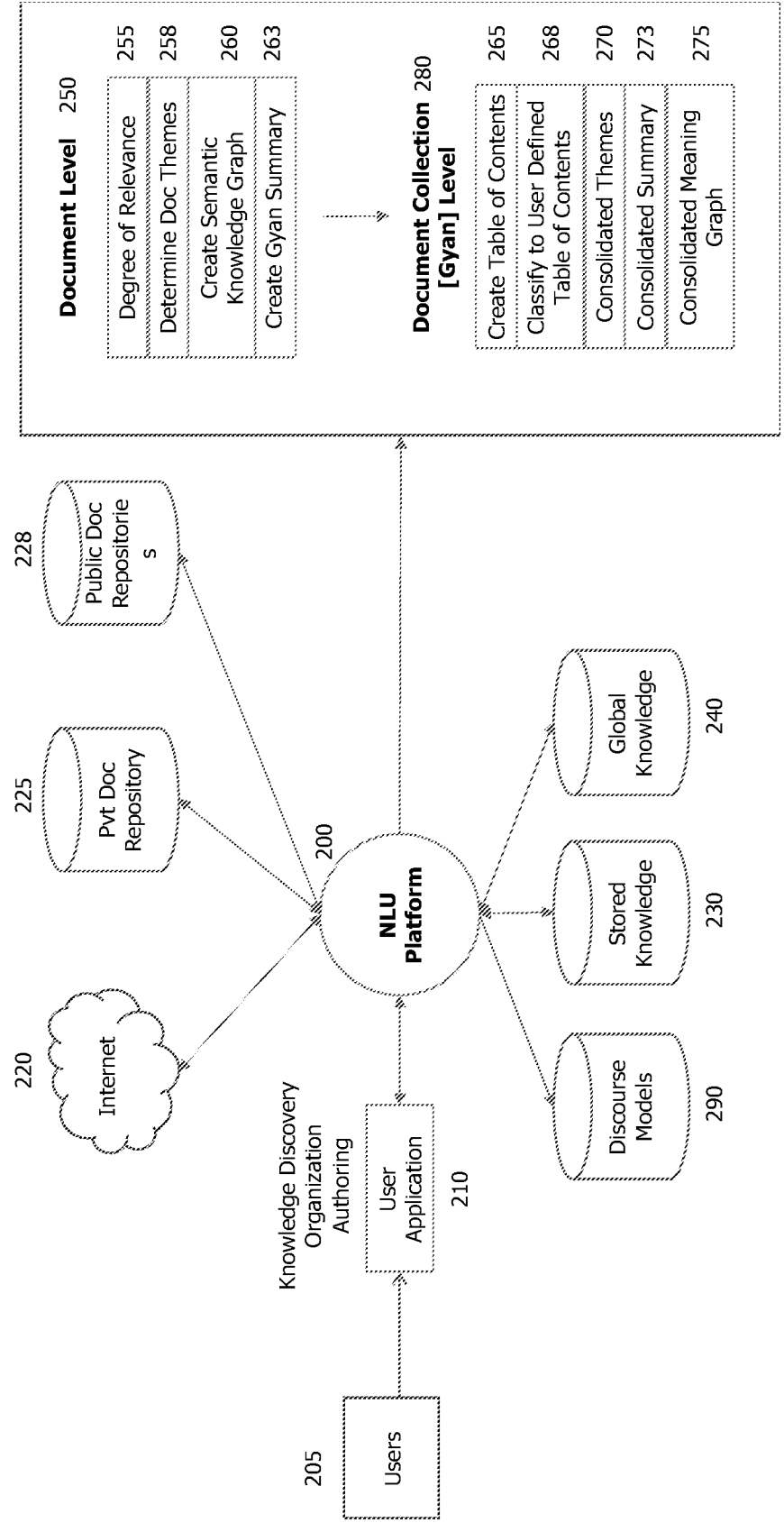
FIG. 2 illustrates the NLU Platform High Level Architecture in accordance with one or more embodiments set forth herein.

There are innumerable use cases for automated machine processing of natural language content in the world. Almost all the technologies available today for machine processing of natural language rely on neural language models of word patterns including patterns based on a semantic representation of each word. This approach does not understand the text in its complete compositional context. Humans understand the text in its full compositional context. For avoidance of doubt, unstructured content can be videos or audio data which are transcribed to text for processing.

Traditionally, the tag of words' method has been the popular approach for natural language processing (NLP) tasks. The bag-of-words model is commonly used in NLP problems which require classification. A large majority of NLP tasks, e.g., internet search, are classification problems. In the bag-of-words (BoW) model a text (such as a sentence or a document) is represented as the bag of its words, disregarding grammar and word order. Across a collection of documents, the frequency of occurrence of each word is used as a feature for training a classifier. The classifier is then used on a new document to classify it into a set of categories or to identify its topic or to determine its match with a search query, e.g., search query for a search engine. Since the method only focuses on the frequency of words occurring in a document, a BoW model does not retain any context of where and how the words have been used, and has no understanding of the meaning of the document it is processing.

To overcome the limitations of the popular tag of words' method, several large scale pre-trained language models have been introduced. Two categories of statistical methods have been used for building language models—one uses probabilistic approaches like hidden Markov models and the other uses neural networks. Both rely on large corpus of natural language text for their prediction. In a bag of words model, different words have different representations regardless of how they are used. This has led to the development of a novel technique called word embeddings in an attempt to create similar representations for similar words. The popular saying, "A word is known by the company it keeps' is the motivation for word embeddings. The proponents of word embeddings believe this is analogous to capturing the semantic meaning of those words and their usage.

Word embeddings suffer from several significant limitations which primarily have to do with the corpus dependent nature of such embeddings and the inability to handle the different senses in which words are used. Besides, learned word representations based on a corpus to determine which are similar words, is hardly akin to human analogous meaning representation of the complete text.

A language model learns to predict the probability of a sequence of words. The next word with the highest probability is selected as the output by the model. These models are trained on very large amounts of raw text. The probability of a sequence of words given prior words or other word characteristics is clearly not a representation of meaning of the text. These models carry all the bias in the data used to train the model. For e.g., Marcus and David (2021) found that one of the more powerful language models, GPT3, output the bold, italicized text below as continuation of the passage it was provided:

"You poured yourself a glass of cranberry juice, but then you absentmindedly poured about a teaspoon of grape juice into it. It looks okay. You try sniffing it, but you have a bad cold, so you can't smell anything. You are very thirsty. So you drink it. You are now dead."

It is also well-known fact that NLP applications such as chat bots which rely on language models can sometimes spew out racist or sexist comments, as Microsoft found out with the release of their chat bot Tay. It has also been pointed out that prompting GPT2 with 'three muslims' will often lead to text where they are depicted as terrorist or criminals. These examples are illustrative of the bias introduced by the training data set.

The current crop of language models are far from being universal in their ability to 'learn' or 'transfer' knowledge from one application to the next. These models suffer from the same significant limitations—inability to retain full context, lack of explainability, the need for large task-specific data to be combined with the neural language model and the bias from the data.

More recently, here has been a trend towards integration of external knowledge into these models to address some of their limitations. This work has commonly advocated for integration of some form of external knowledge for pre-training large-scale knowledge enhanced LMs. While these enhancements improve the performance of language models, they have not at all addressed the fundamental issue of an explainable meaning representation of natural language text. Bender and Koller (2017) argue that language models cannot in principle lead to learning of meaning. They appropriately define 'meaning' to be human-analogous natural language understanding and argue it is disingenuous to suggest that these language models are close to understanding meaning.

Natural language discourse involves composition of an author's ideas and knowledge using rhetorical expressions as needed. A good discourse will be coherent and follow well accepted principles and rules for discourse structure and content. At a higher level, there are different types of discourse models—news articles, blogs, research papers, legal documents, email, social media posts to name some. Each of these have a well-defined discourse model which is understood by people skilled in that field, e.g., lawyers understand the discourse model underlying legal contracts; most of us understand the model for an email; news articles follow a discourse model and so on. A human-analogous meaning representation model has to recognize the discourse model underlying the composition. Besides, such a representation has to be explainable. This cannot be achieved by any of the current methods.

As an exemplary illustration of the need for natural language understanding by machines, consider a common task most knowledge workers perform routinely—research. It is estimated that there are roughly 1 billion knowledge workers in the world today and growing. Examples of knowledge workers include students, teachers, academic researchers, analysts, consultants, scientists, lawyers, marketers and so on. Knowledge workers can be found in every field. The research or knowledge acquisition work they perform today involves the use of search engines on the internet and the use of search technologies on internal or private document collections. Search engines have provided immense value in providing access to information where there was no access before. But they only provide access and that is the starting point for research. However, even in providing access, current search engines, whether on the internet or private document repositories, generate substantial false positives because of the limitations outlined above.

When a user queries using a search engine, say Google, the results are commonly displayed as 1-10 items out of a large number of hits! Because today's search engines are still unable to fully understand the text inside documents, there are both false positive and false negatives in the result set. Based on the query, irrelevant results can be seen as early as the first page in a display setting of 10 items on a page and most certainly in subsequent pages irrespective of the nature of the query. Similarly, highly relevant results listed much later in the list like on pages 10-20 for a query. In processing the results from today's search technologies, the user has to open each item to first determine which of the search results are truly relevant to their query.

In an experiment, a search was conducted for 'Data Science and Ethics' in MIT's popular Open Courseware content collection. In the results, 80% and more were irrelevant including 5 out 10 results on the first page. Similarly, FIG. 1 shows the results of an analysis of 10 random queries using a popular search engine. Selected queries had one, two and three words and some had highly ambiguous words. For each query, a human expert reviewed all the 1,785 articles in the entire result set from the search engine to label the articles as relevant and irrelevant. The analysis considered home pages, index pages, audio, video pages, books, shopping pages as irrelevant. FIG. 1 shows relevant and irrelevant results by default page display on the browser. Across all the 10 queries, Google returned only 59% relevant results. As can be seen, there are a lot of relevant results in later pages and vice versa. The user will have to read every document first to determine relevance.

The level of inaccuracy in search engine results is only the first issue. This step is the 'access' step of the research task. Today's technologies provide no assistance with the remaining steps. Once a knowledge worker identifies and obtains relevant documents, the next step is to organize them for effective manual processing. This can be in the form of organizing them into sub-topics. Then the human has to read each document, understand and synthesize the knowledge in each document and develop an aggregate understanding across all documents. Further, knowledge acquisition is not one time and therefore, the research output will need to be continuously updated with fresh knowledge on the topic. Current search technologies are incapable of providing automated assistance for the full research or knowledge acquisition process from unstructured content.

Text summarization is another NLU task which requires a full understanding of the contents of the document. It can be the synthesis task in the research workflow above. The growing volume of text on the internet and in private corpuses has to be summarized for it to be useful. Of course, the need is to summarize text in an automated way without losing meaning and coherence. Automatic text summarization is the task of producing a concise and fluent summary without any human help while preserving the meaning of the original text document There are two types of text summarization—extractive and abstractive. In extractive text summarization, the summary retains original sentences from the content. In the case of abstractive summarization, an attempt is made to replicate how a human might summarize the document using their own global knowledge. Current technologies are only partially successful in extractive summarization and very poor in abstractive summarization. Effective extractive summaries are very useful for the knowledge worker.

Topic Modeling is another very common NLU task. Current technologies are inadequate to identify the top topics in a document because they are not designed to understand the content of the document in its full compositional context. A popular digital publishing site wanted to enhance the ability of the user or subscriber to find articles and content of interest to them. The organization defined a topic ontology into which they wanted to classify their content documents. A popular language model achieved only 20% correct classification. The model is not explainable and has been trained on a very large corpora. Obviously, its training data may not be adequate for classifying the site's content and its model is not focused on understanding the complete content of each document before it identifies top topics.

There are other exemplary use cases which require full understanding of unstructured content—tagging unstructured content, comparing multiple documents to each other to detect plagiarism or duplicates, and automating the generation of intelligent natural language output.

There is thus a clear need for a platform to automatically interpret natural language content in complete compositional context, operate with little or no data, and be explainable and tractable. The method and system should also be able to integrate pertinent knowledge outside the textual discourse. In the research or knowledge acquisition example above, the platform should be able to automate or substantially assist the knowledge worker with all the research tasks. And in the topic modeling example, the platform should be able to improve the identification of top topics from each document on the basis of complete understanding of its content including compositionality.

Summary of the Current Invention

In this section, a natural language understanding platform [NLU Platform] based on deep learning with knowledge-based computational linguistics [CL] is disclosed. This platform is also referred to as a compositional language model. The platform retains complete context, traceability and does not necessarily require any data to operate. Thus, while the invention relies on deep linguistic learning, it does not require learning from data as in conventional machine learning which need to be trained on data to operate. If any data is available, the platform can leverage it and the platform will only require a fraction of the data that contemporary machine learning technologies will require. This is observed from the several sets of results provided later in this disclosure.

The NLU Platform generates a meaning representation for natural language. The representation allows for zero-shot or few-shot learning. The use of the NLU Platform is illustrated for an exemplary NLU task—for automated research requiring human-analogous understanding. While the word 'document' is used extensively in the disclosure, the definition includes video or audio content which are transcribed to text for processing. The words 'document' and 'content item' are used interchangeably in this disclosure.

Generally, the task of understanding and therefore representation becomes more complex with the length of the text. The longer the text, the more complex it is to understand by humans and any machine representation will also inherit that complexity.

Understanding is conceptualized in terms of 'layers', starting with a high level understanding of the document's main idea expanding to understanding of additional details or layers. The user might want to understand the essence of a discourse; the distinct themes in a discourse; from a certain prior perspective; an individual's point of view expressed in the article; and so on. This suggests that the user needs a flexible and layered representation for 'understanding' a discourse.

A universal meaning representation of natural language involves decomposing the text back into the concepts and discourse relations used by authors to express their ideas. This requires reverse engineering the text back to its fundamental ideas and the phrases and compositional elements that were connected together to form sentences and paragraphs leading to the full document. And to fully understand it the way humans do, it needs to integrate prior/global knowledge.

More specifically, the machine representation should be capable of answering or supporting the following needs:
What is the main idea in the document
What are the other ideas in the document?
How are the ideas supported by other ideas and reasoning?
Can it be used to create a summary of the document content to avoid reading the entire document?
Can it be used to create a idea-specific summary of the document based on our interest in a specific idea in the document?
Can it be used to create a layered understanding representation so the reader can unpeel layers based on their interest and at their own pace?
Can it be used to reduce cognitive load through a multi-layered representation and visually effective displays such as graphs?
Can the representation be enhanced with global knowledge outside of the document just like humans do in the natural course?
Can it be used to dynamically create a knowledge collection on any topic?

Can it be used to aggregate understanding/synthesize across multiple documents or a knowledge collection?

Can it be used to identify the main topics across a collection of documents or a knowledge collection?

Can it be used to generate natural language response?

FIG. 2 describes the NLU platform 200 at a high level. FIG. 2 outlines the NLU platform's major components and their relationships according to the preferred embodiment of this invention. Users 205 interact with the NLU Platform Application 210 for conducting research or discovering knowledge on an ongoing basis. The Application 210 forwards the one or more topics that users 205 are interested in to the NLU Platform 215. The NLU Platform 200 encapsulates all Document Level 250 and Document Collection Level components shown in FIG. 2 on the right. The NLU Platform 200 uses any of the popular search engines on the Internet 220 to find content for the topic(s). The NLU Platform 200 can also aggregate content from the public internet 220, private or internal document repositories 225 and public document repositories 228 like PubMed, USPTO, and others. The NLU Platform 200 then processes the results to generate output shown as Document Level 250 and Document Collection level 280 components. Stored Knowledge 240 contains previously created knowledge by the user at a topic or concept level. Global Knowledge 260 contains knowledge that is available to all the users about concepts and relationships. Discourse Models 290 contain the discourse structure for different discourse types such as emails, contracts, research documents among others. Both stored knowledge and global knowledge are not explicitly present in the documents being processed e.g., "can you Xerox this document" implies copying the document.

Figure 3:
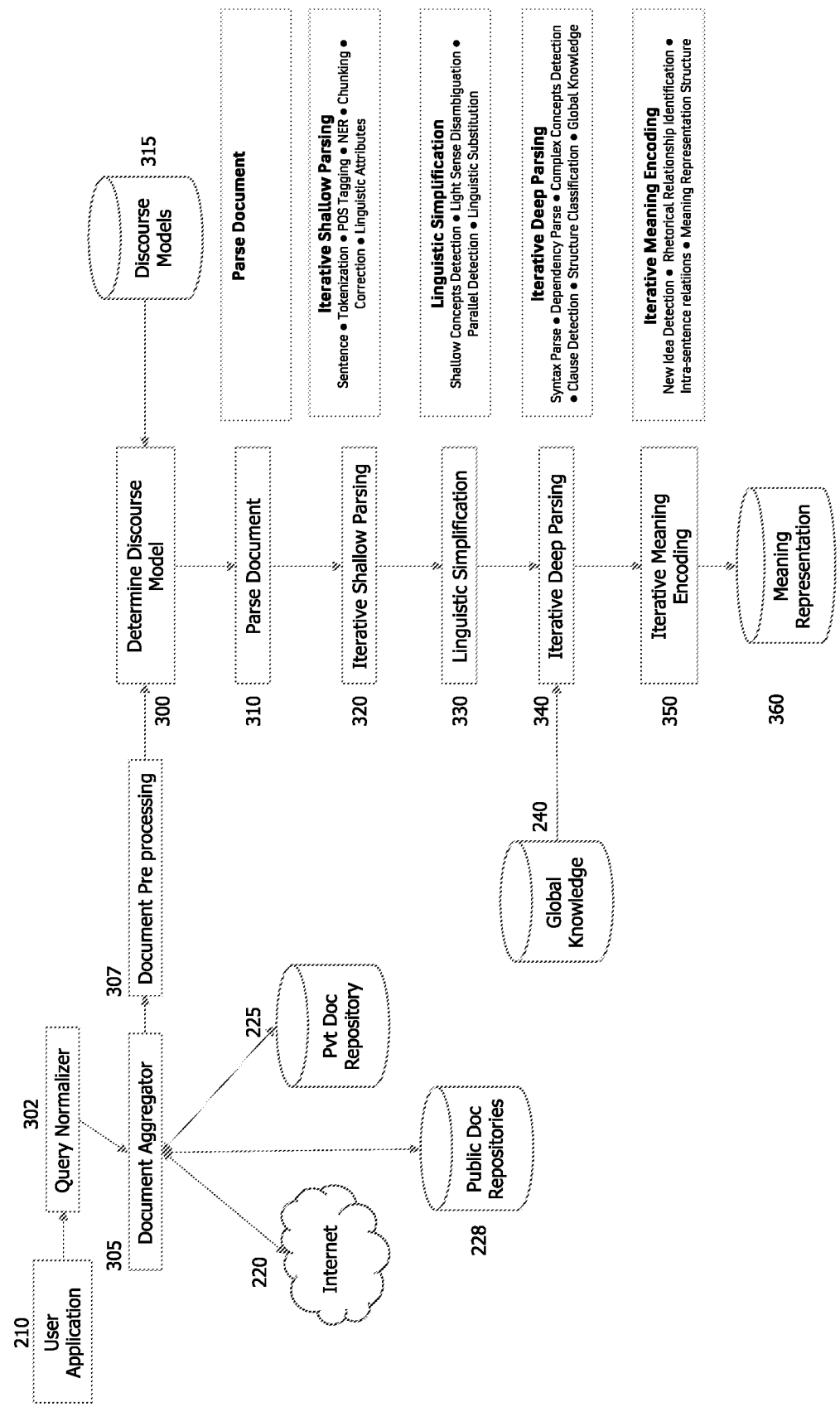
FIG. 3 presents the NLU Platform Pipeline in accordance with one or more embodiments set forth herein.

FIG. 3 describes the NLU Platform's processing flow. Once the NLU Platform 200 receives the user's topic(s) or query from the NLU Platform Application 210, the query is normalized by the Query Normalizer 302. The Query Normalizer 302 examines the query and extracts the concepts and if present in the user's query the intent of the user expressed in any rhetorical expression in the query. As an example, if the query is 'does coffee cause an increase in blood pressure?', the Query Normalizer 302 will extract 'coffee', 'blood pressure' and also "cause an increase' as the specific rhetorical relationship of interest between 'coffee' and 'blood pressure'. Consider another example where the query is 'Coffee and Cancer'. In this case, the Query Normalizer 302 will normalize a query as a compound concept of interest to the user and default to finding all types of rhetorical relationships between the two simple concepts—'coffee' and 'cancer'.

Document Aggregator 305 executes the query on the sources it has access to for the users 205. In an exemplary embodiment, the Document Aggregator 305 has access to the Internet 220, Public Doc Repositories 228 and Pvt Doc Repositories 225. On the internet 220, the Document Aggregator uses a search engine like Google. The Document Aggregator 305 passes the results to the Document Pre-Processor 307 which performs a series of pre-processing steps on each of the documents. Examples of such pre-processing actions include stripping or cleansing the document of any html tags, any extraneous information which is not part of the document content. The Document Pre-Processor 307 provides a clean document to Determine Discourse Model 300 which examines the document structure to determine its discourse model. Determine Discourse Model 300 loads available discourse model structures from Discourse Models 290. Common examples of discourse models are emails, articles, blogs, and research reports.

Administrators can add new discourse models using an abstract discourse model structure without any programming. If a new discourse model requires changes in the abstract discourse model structure, the Determine Discourse Model 300 component is enhanced. The discourse model structure is explained more detail later in this section.

Once the NLU Platform 200 has determined the discourse model, the document is parsed using the Document Parser 310. Document parsing takes the discourse model as input, performs format-specific native document parsing, and converts the data into a format-independent representation. Examples of formats include HTML, Docx, PDF, Pptx, and eBook. Parsing includes explicit parsing of native elements including headers, footers, footnotes, paragraphs, bulleted lists, navigational Links, and graphics. After parsing, the Document Parser 310 organizes the contents into a hierarchy graph, with sufficient attributes to maintaining absolute traceability of every element.

Once basic processing is completed, the document goes through the Iterative Shallow Linguistic Parser 320. The Iterative Shallow Linguistic Parser 430 performs shallow-NLP tasks to evaluate mechanical and linguistic attributes of every chunk of text from the hierarchy graph representation of the document. It identifies paragraphs, sentences, clauses and tokenizes the sentences by words. It determines Sections (child-sections), Paragraphs (child paragraphs), Sentences, Words, Parts-of-speech (POS) Tags, Lemmas, Phrases, and Linguistic Attributes (see the expanded taxonomy in Wikipedia Page on Grammatical Category). Every attribute has a role to play in subsequent steps of the pipeline. These attributes form the components of linguistic rules in subsequent steps.

The Iterative Shallow Linguistic Parser 320 is iterative because of the common errors produced by out-of-the-box shallow-NLP parsers. This is done to prevent common errors in parts of speech tags from popular part of speech taggers. These rules are a function of the word itself or the words preceding or succeeding the word, clauses and their attributes, sentence type and sentence attributes. Such rules are stored as meta data and can be enhanced by the user or administrator without any programming.

Linguistic Simplifier 330 performs further simplification using linguistic and structural rules (at various levels) to improve the accuracy of the parsed output. The linguistic simplifier 430 also incorporates external knowledge to detect real-world concepts (through light sense disambiguation) to aggregate words to generally simplify the sentence's length. Mechanical sub-sentence detection (and separate processing) to further normalize sentence lengths, while maintaining the information and relation is also performed by this component. The Simplifier 330 also performs mechanical substitutions to present the parsers with familiar words and semantic substitutions to present parsers with a 1-2 word for entire sub-clauses or phrases in order to prevent common errors. Substitutions are identified using KnowledgeNet and Linguistic Attributes (from Shallow Parsing), parallel boundaries are expanded (e.g., legal and constitutional rights=legal rights and constitutional rights) and subordinate clauses are simplified (e.g., single families that own homes=single family home-owners).

Iterative Deep Parser 340 performs a deeper parsing of sentences. It is iterative to correct specific errors in parse-trees due to mis-judgement by POS-taggers. After correction, the process is re-initiated. The Deep Parser 440 also determines concepts and their co-references. Co-referential relationships are pronomical, e.g., the use of pronouns to refer to nouns used earlier or later in a document or they can be pragmatic relationships e.g., the use of 'xerox' to refer to copying. To enable deeper co-referential and other rhetorical relationships between concepts, the Deep Parser 340 also integrates additional contextual real-world knowledge, e.g. Civil Rights Movement also signifies a 'Time-Period' when present with prepositions like during, after, etc. Wikipedia tells us that this time-period is from 1954 to 1968. Also provides us the fact that Rights is a Noun here, not a Verb or Adjective because of its reference (direct or implied) throughout that document. This component also determines sentence structures including qualifications and constraints in the structure, if any, e.g., Civil Rights Movement during Kennedy Administration.

Iterative Meaning Encoder 350 creates the human analogous meaning representation layers using all the output of the preceding components. This includes detection of ideas, the rhetorical relationship among ideas both within an idea and across ideas. The Meaning Encoder 350 also determines important linguistic metrics like importance of ideas/rhetorical expressions, central themes, and primary topics. The Meaning Encoding process performed by the Iterative Meaning Encoder 350 outputs a combined Meaning Representation hyperGraph (MR) that combines and preserves the following: Hierarchy, Ideas, Arguments/Rhetorical Expressions, Sentences, Clauses, Concepts. The MR is completely invertible, and the entire document can be generated from it and vice-versa. The Meaning Encoder 450 also derives attributes (importance, layers, summaries, etc.) to enable more selective analysis and specialized understanding needs.

There is wide acceptance that graphs present an effective way of mirroring the way humans organize and view information. Graph-based representation of discourse preserving its compositionality can effectively allow us to proxy the above levels of understanding of text by a computer. Meaning Representation Graphs [MRs] provide a meaning representation for any document or collection of documents consistent with the above multi-layered definition of meaning.

An MR graph should be distinguished from other graph forms in the literature such as Knowledge Graphs, Concept Graphs and AMR graphs. While there is overlap in all these graph representations, the MR Graph represents the complete document in terms of its compositionality [sentences, phrases, clauses], concepts, and rhetorical linkages between concepts in their surface form. MR maps the surface rhetorical phrases to an abstract rhetorical relationship type but remains invertible.

MR is a multi-layered meaning representation for any document. Meaning is defined to be an understanding of the concepts and relationships between concepts as described in the discourse. This is, of course, supplemented in the human mind with existing knowledge about the concepts and inter-relationships. The layered representation of meaning in the NLU Platform 200 is presented first and later it is expanded that to include knowledge outside the document that is germane to understanding the document.

Conceptually, a document can be defined to be a set of ideas on a subject that the author intends to communicate to an audience. The ideas in turn are expressed in the form of sentences where each sentence expresses a relationship between certain concepts using rhetorical linkages. Thus a simple sentence can be thought of as having a subject and an object which are linked through a verb.

Mathematically this idea can be represented as follows:
Document D={I} where I is a set of Ideas or Themes, where, I={S} where S is a set of sentences,
S={C, R} where C is a set of concepts and R is a set of rhetorical expressions The NLU Platform 200 enumerates the above definition computationally to generate the MR graph. As noted before, the generated MR graph is multi-layered allowing a gradual unpeeling of meaning. 'Ideas', 'themes', 'topics, are used interchangeably in the remainder of the disclosure.

Figure 4:
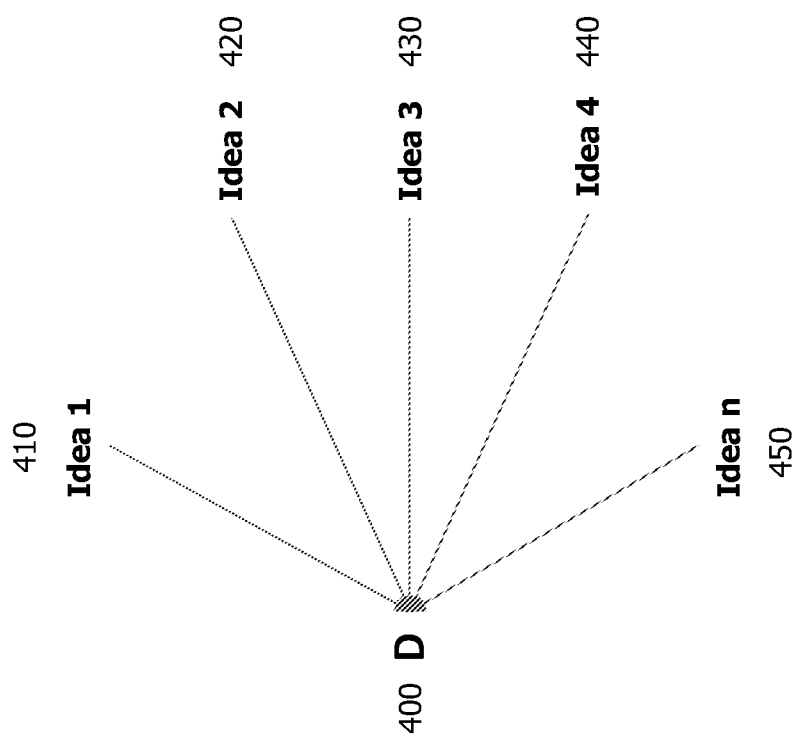
FIG. 4 presents an exemplary NLU Platform Meaning Representation Graph Main Layer in accordance with one or more embodiments set forth herein.

Consider a hypothetical document D comprising many sentences {S1, . . . Sn}. At the highest level, the NLU Platform 200 MR is a graph of the ideas in the document. FIG. 4 shows this conceptually. In the case of short documents, the document may reflect only 1 idea. The longer the document, the greater the number of ideas. Most documents though are likely to have a main theme and several sub-themes. In some cases, like analyst reports, the sub-themes can be relatively independent of each other.

Conceptually, sentences that reflect an idea or theme should be together and each new theme should ideally manifest in a new collection of sentences. Remember that since all the sentences are from the same document, all sentences are going to be related. However, it is of interest to detect the major sub-themes expressed in the document.

The NLU Platform 200 detects ideas through a deep examination of the linguistic structure/attributes of the document at the word, clause, sentence, paragraph, section and whole document levels. All the parts of the document are analyzed to determine how they are related rhetorically and linguistically to other parts of the document.

Each idea comprises multiple sentences in the discourse with the main sentence introducing the idea being the head sentence for that idea. The idea can be represented through the sentence or the main concept in the main sentence.

Figure 5:
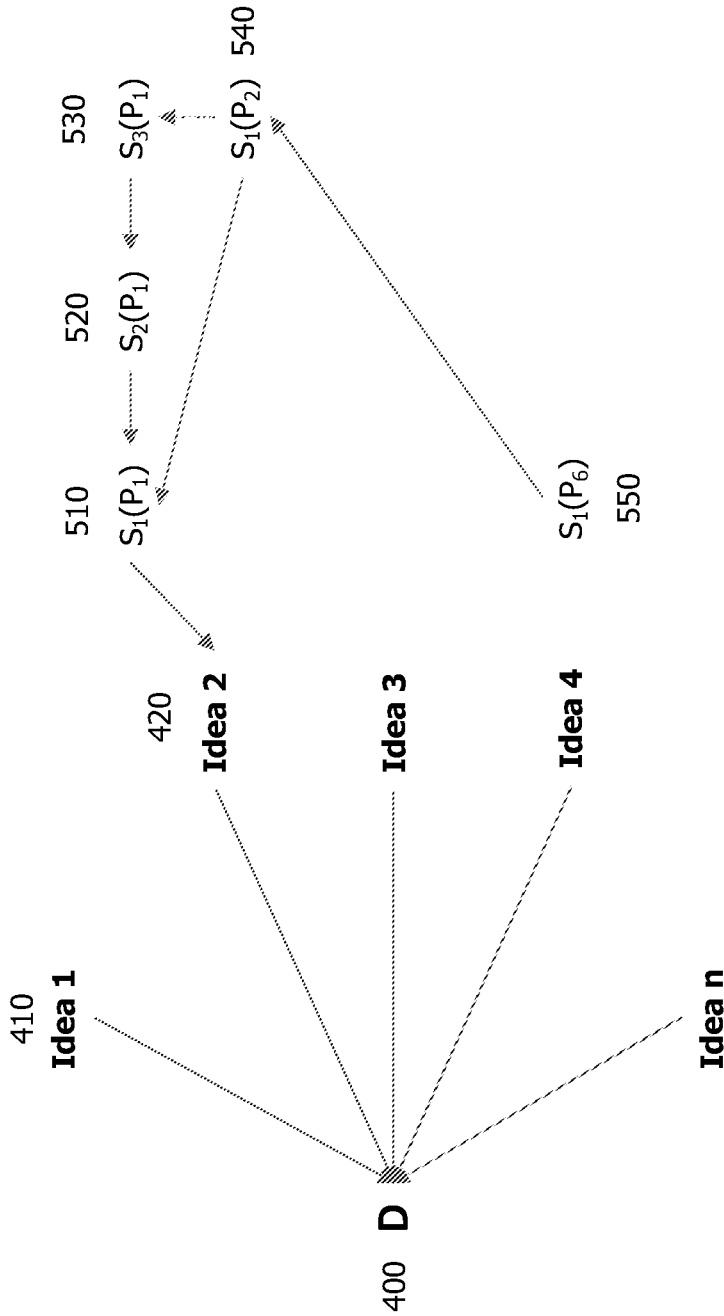
FIG. 5 presents the NLU Platform Meaning Representation Graph Sentence Level in accordance with one or more embodiments set forth herein.

FIG. 5 shows the meaning representation of FIG. 4 with expanded representation for Idea 1. The expanded representation shows that Idea 1 comprises a number of sentences in the document from the first and second paragraphs. The NLU Platform 200 uses a comprehensive set of linguistic attributes at the word, clause, sentence, paragraph, section and whole document levels as well as discourse model elements to detect the start of an idea or theme. An example of a discourse model element is the 'new paragraph' marker.

FIG. 5 displays Idea 1 as comprising S1, S2, S3 of paragraph P1, S1 of paragraph 2 and so on. FIG. 5 also indicates the rhetorical relationship between sentences, e.g., R12. R12 indicates the relationship between sentence S1(P1) and S2(P1). Examples of such relationships are elaboration, temporal among others. Very simply, if R12 is identified as 'elaboration', S2 is judged to be an elaboration of S1(P1). The NLU Platform 200 has the ability to detect a complete set of such rhetorical relationships.

Next, the MR is expanded to a concept level representation of the document. A NLU Platform 200 Concept Graph is a complete cognitive representation of the document at a concept level. The NLU Platform 200 expands the sentences to reveal their compositional structure in the form of concepts and relationships between them. Relationships between sentences are also effectively relationships between the subjects of those sentences. For example, a sentence starting with a pronoun refers to a person in the sentence it is related to. A concept can be a noun or a phrase and in some cases, it can be a normalized form of a noun or verb phrase. It is a directed graph consisting of nodes and edges where nodes are concepts and edges are the text phrases that connect a concept to another concept.

Figure 6:
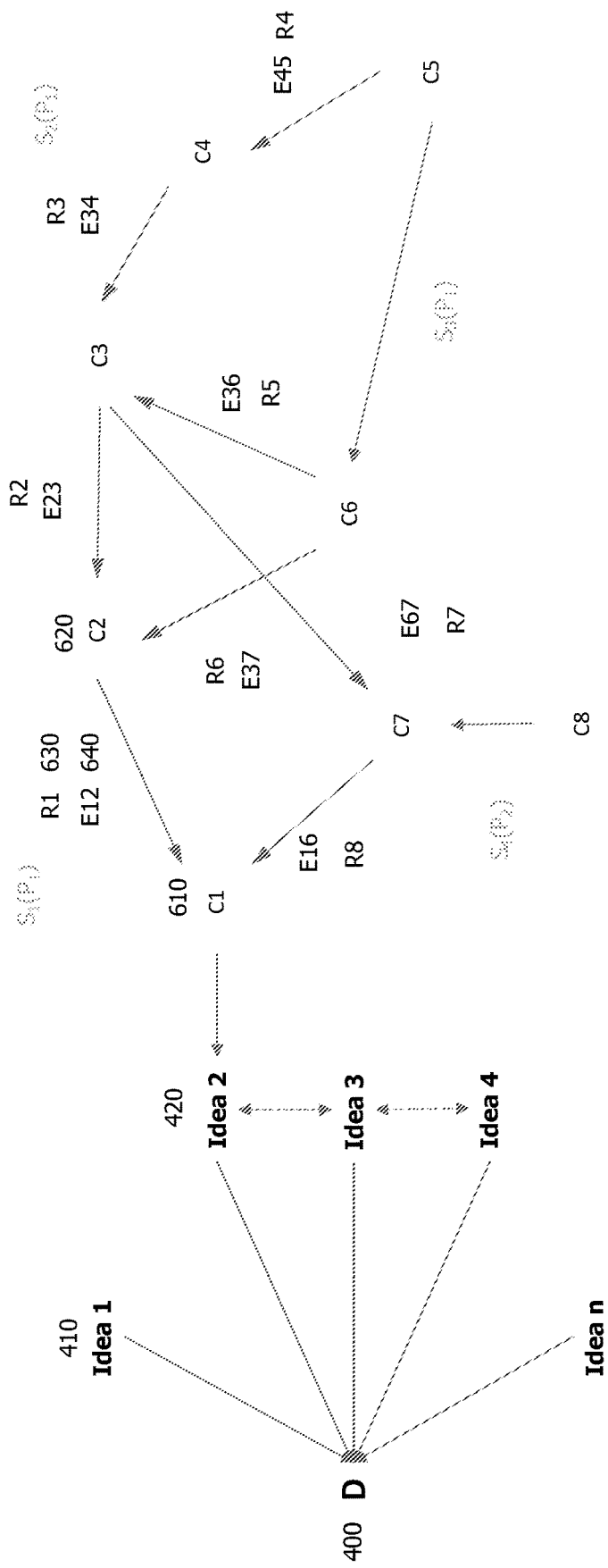
FIG. 6 presents the NLU Platform Meaning Representation Graph Concept Level Layer in accordance with one or more embodiments set forth herein.

The NLU Platform 200 Concept Graph, GG, can be formally defined as:

GG={V, E}
Where GG=Concept Graph,
V=set of vertices {A, B, C, D, E, . . . } in GG and
E=set of edges with surface level rhetorical phrases,
Eg=edges between $i^{th}$ and $j^{th}$ vertices
R=Abstract relationship types for the surface level rhetorical phrases, E FIG. 6 shows an illustrative directed graph with concept nodes $\{C_1, \ldots C_8\}$ and Edges E. Each Edge in E is denoted by $E_{ij}$ where i is the source and j is the target. $E_{ij}$ is mapped to an abstract relationship type, $R_{ij}$ where $R_{ij}$ belongs to a set of abstract relationship types R. Edges E can have a weight associated with them which can indicate their semantic importance in interpreting the overall meaning of the document. The NLU Platform 200 uses default weights based on the abstract relationship type R to which the edge is mapped to. For clarity, FIG. 6 does not show the edge weights, RW.

FIG. 7 displays four typical discourse models for news article 710, research article 720, email 730 and a legal contract 740. As can be sheen the discourse models have a hierarchical structure. Any node in the hierarchy in the discourse models is optional with the nodes with [ . . . ] discretionary and the other nodes typically always present. Structurally though, the administrator can create any number of discourse models in Discourse Models 290 with a unique label to name the discourse model. Similarly, the administrator can create any level of depth in the hierarchy. To illustrate, the legal contract DM 740 has a node titled 'Clause 1 Test' and a child node titled '[sub-clause]'. The Administrator can create a child node for the sub-clause if desired. The NLU Platform 200 attempts to find the discourse model which matches the document the closest.

FIG. 8 displays a sample news article related to immigration enforcement. For illustrative purposes and ease of reference, each sentence is labeled as S1, S2, S3 . . . Sn.

Figure 9B:
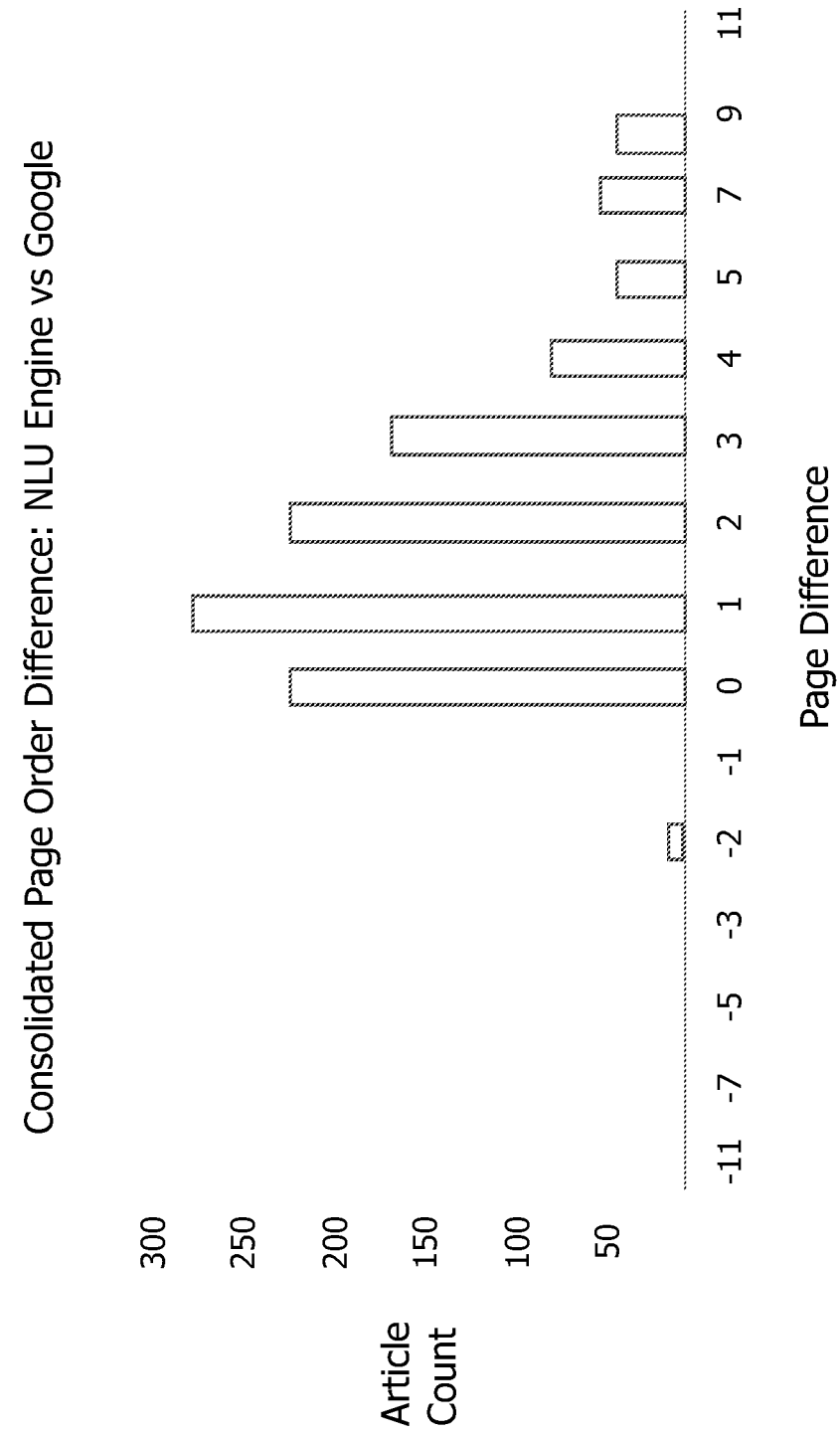

FIG. 9*a*-*b* presents the analysis from the NLU Platform on the results of the 10 queries reported in FIG. 1. The results from the search engine were processed using the NLU Platform 200. The NLU Platform's output are displayed in FIGS. 9*a*-*b*. There is substantial improvement in detecting relevant documents using the NLU Platform 200. FIG. 9*a* shows accuracy metrics for the NLU Platform 200 vs the search engine. The precision with which relevant items were detected improved significantly by 29% from 59% to 88%. F1 score also improved from 74% to 89%. A Mean Square Error [MSE] statistic is also shown based on the ranking of an item based on relevance according to the NLU Platform 200 and the sequence of the item in Google results. FIG. 9*b* shows this graphically. It shows the frequency distribution of page difference computed as the [Google Page—NLU Platform Page]. The results are striking—the NLU Platform 200 can detect relevance much more accurately.

Figure 10:
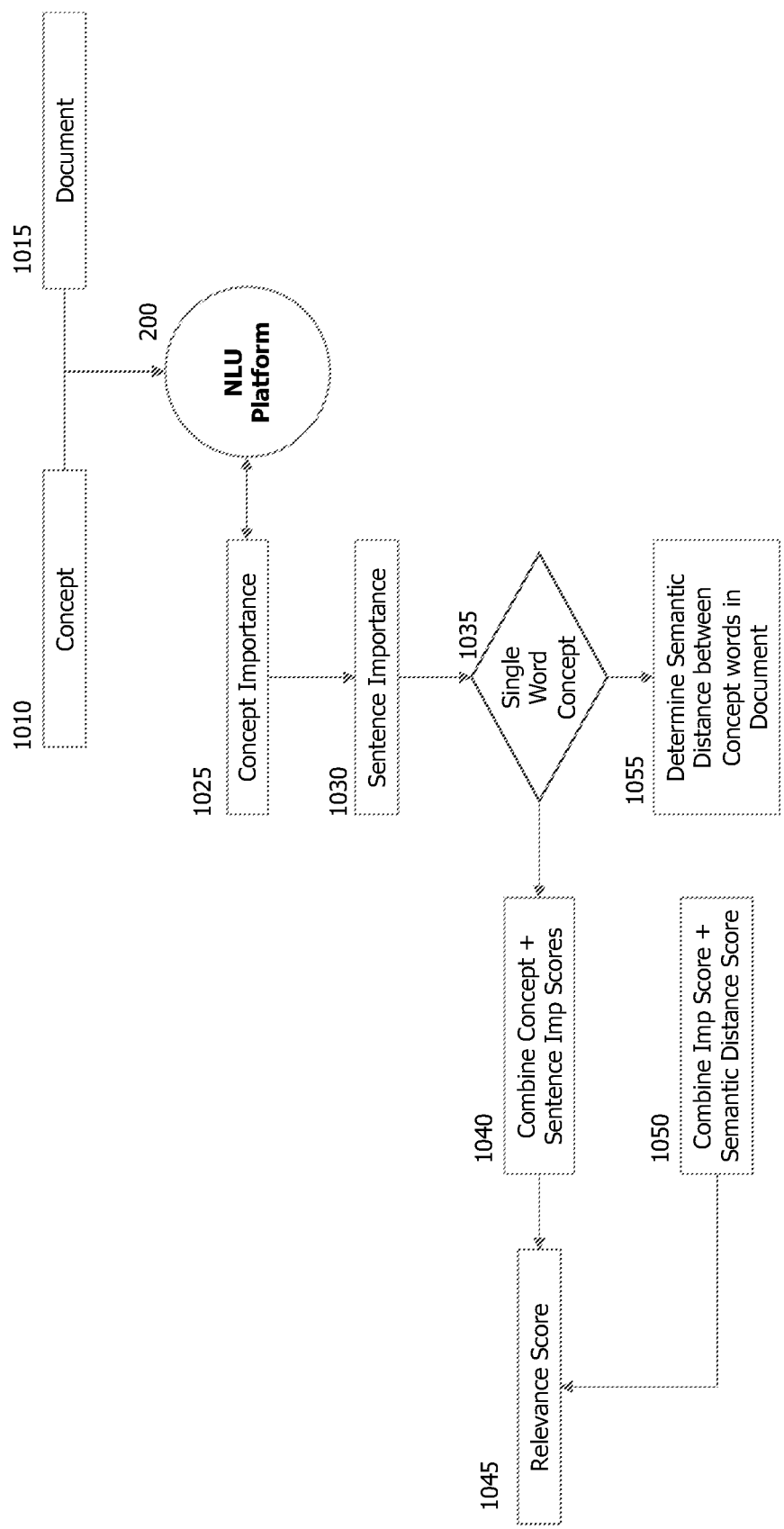
FIGS. 10A and 10B presents an analysis of results from the NLU Platform 200 for the same 10 queries reported in FIG. 2, Note: After concept-detection (occurrence of the concept in the SKG of the Document), for a complex concept (multiple topics), apart from Sentence Importance (main idea, main cluster, etc.) and Concept Importance (subject, etc.), NLU Platform 200 also determines Context Strength. Context Strength will determine how well the document is referring to the multiple concepts in the complex concept in each other's context.

FIG. 10 describes the process of determining relevance of a document to the query topic by the NLU Platform 200. Concept 1010 and Document 1015 are input to the NLU Platform 200 which goes through a 3 step process to determine the relevance of that document to the query. After concept-detection (occurrence of the concept in the MR graph of the Document), for a complex concept (multiple topics), apart from Sentence Importance (main idea, main idea sentence set) and Concept Importance (subject), NLU Platform 200 also determines Context Strength. Context Strength will determine how integral the concepts are to each other in the context of the document. For example, are each of the words in the complex concept occurring in various places in the document without directly in each other's context or are they occurring in direct contextual relation to each other.

FIG. 11 shows the concept level representation for the first sentence in the document in FIG. 8. The nodes in the Figure represent concepts in the sentence and edges reflect the expressed rhetorical relationship.

FIG. 12 displays the summary for the document shown in FIG. 8. The NLU Platform 200 found 7 out of 27 sentences to reflect the essence of the document. If the user wants to expand any of the 7 distinct ideas/themes from the document contained in the summary in FIG. 12, the NLU Platform 200 will expand that idea with the sentences that are part of that idea. The expansion can be filtered by a specific set of rhetorical relations the user is interested in, e.g., 'causal'. The synopsis will be at the level of granularity that the user is interested in. In a similar vein, it can reflect only the types of rhetorical relationships the user is interested in. For example, a user may only be interested in the main ideas in the document and may not be interested in any 'elaboration'. The NLU Platform 200 also generates a summary for any document topic that is of interest to the user. For example, a user may be interested in the main topic of the document or one of the other topics in the document. The summaries generated by the NLU Platform 200 will be different based on the user's preferences.

Figure 13:
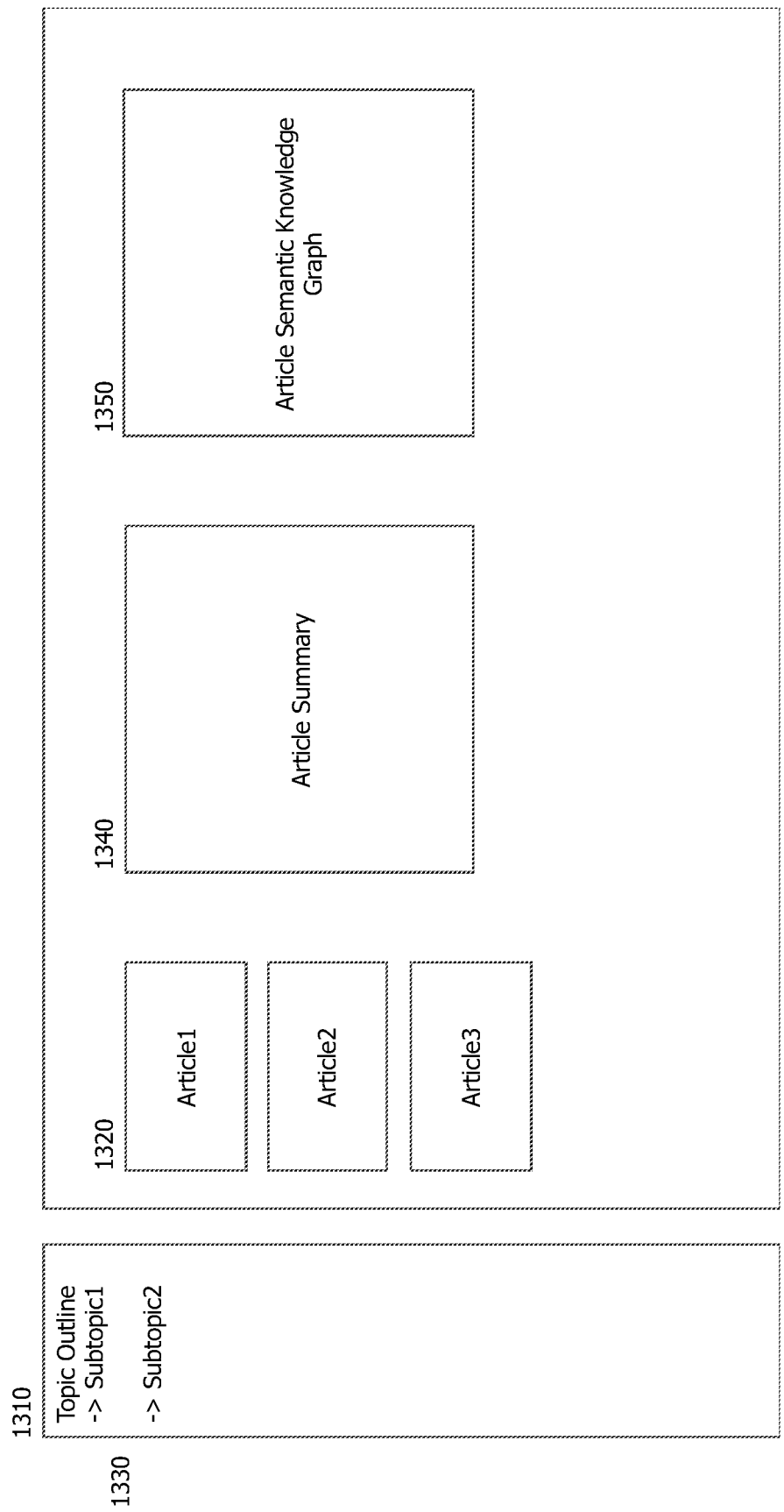
FIG. 13 illustrates an exemplary knowledge collection on the topic of Electric Vehicles using the NLU Platform 200.

FIG. 13 displays Electric Vehicles Knowledge Collection produced by the NLU Platform 200. The table of contents—COP26, Government, Corporation, Small Business, Individual, and Justice are generated by the NLU Platform 200 based on its complete understanding of the content of all the documents it found relevant. Each of the table of content topics has the number of content items that the NLU Platform 200 has classified into that topic. A content item can be classified under more than one table of content topics. It should be noted that in such cases the synopsis for the different topics will be different. Selecting or clicking any of the table of content topics results in the NLU Platform Application 310 displaying relevant articles for that topic. Selecting the root topic, 'Climate Action', results in the NLU Platform Application 210 displaying all relevant articles for 'Climate Action'.

Figure 14:
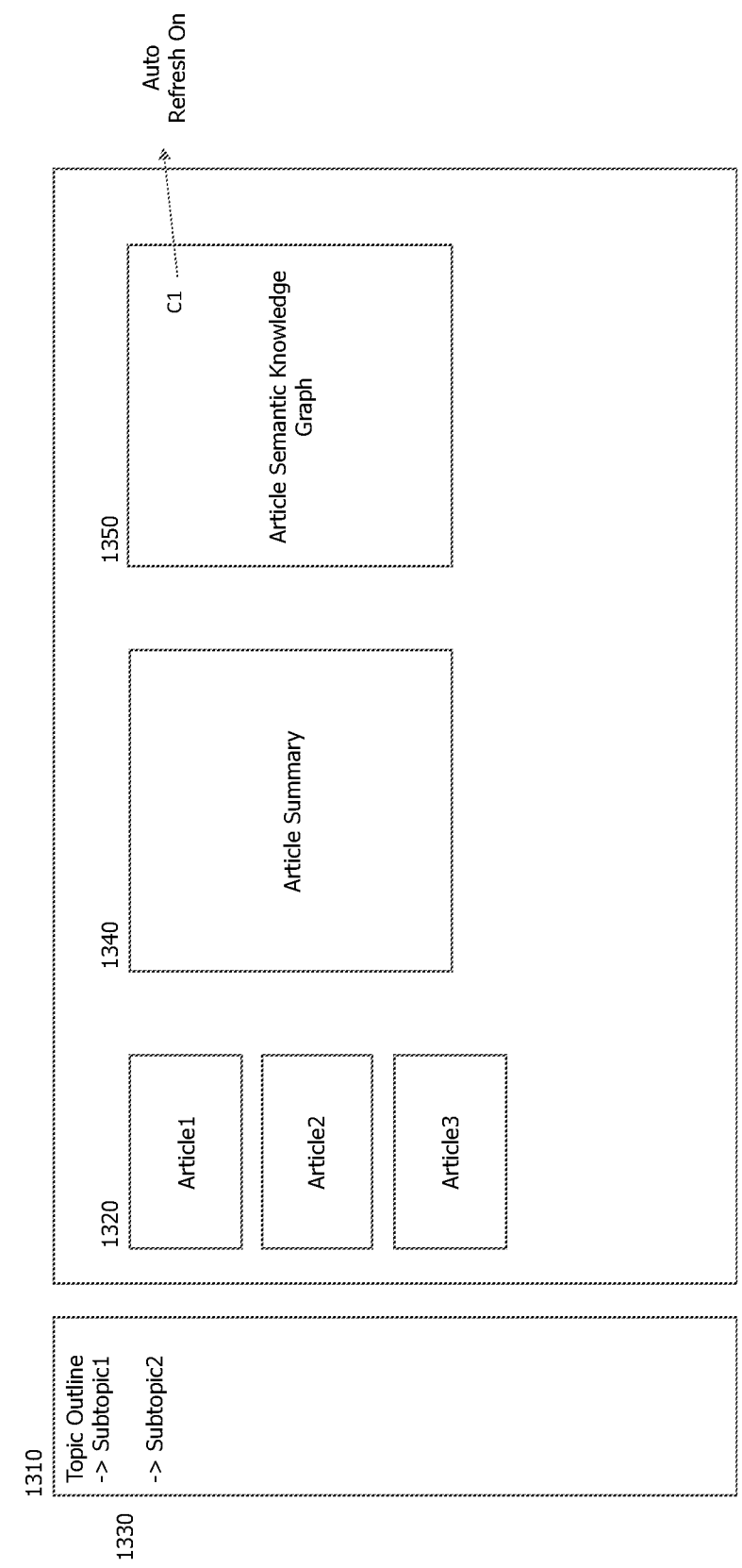
FIG. 14 illustrates an exemplary real time knowledge discovery process where the NLU Platform proactively finds and integrates new knowledge on any topic with the existing Meaning Representation graph in accordance with one or more embodiments set forth herein.

FIG. 14 shows an example of continuous knowledge discovery and update. It shows that auto discovery is turned on for a specific node. The NLU Platform 200 then automatically seeks and finds relevant new content items for that node and all its child nodes. The newfound content items are then processed by the NLU Platform 200 and integrated into the current 'Knowledge Collection' using its normal processing steps. In one embodiment of the invention, the newfound knowledge can be staged for a super user or author to review and decide which of the newly found items should be integrated.

Figure 16:
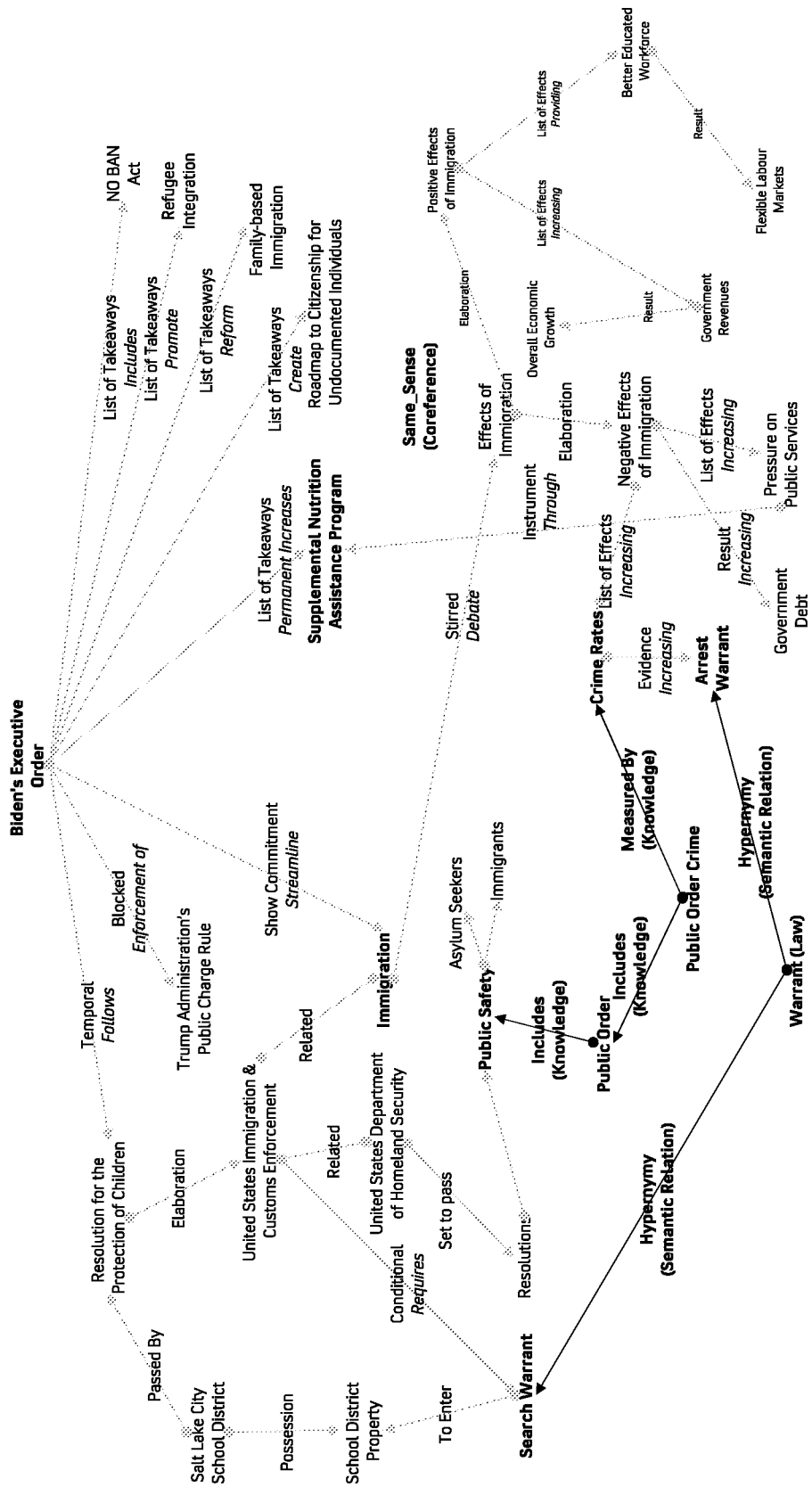
FIG. 16 illustrates an exemplary aggregate Meaning Representation wherein the NLU Platform 200 has consolidated Meaning Representation Structures for individual documents by eliminating redundant meaning in accordance with one or more embodiments set forth herein.

FIG. 15 illustrates top topics or tags produced by the NLU Platform 200 for an exemplary collection of 7 documents. Top topics can be produced for the entire content item or separately for different sections of the content item. FIG. 16 is an illustration of the NLU Platform 200's zero-shot learning capability. The NLU Platform 200 was applied to these 7 documents to determine if it could detect topics in the document correctly matching manually generated tags. The use case was to maximize discoverability of such documents by customers/prospects when they search by keywords. FIG. 16 also shows that the NLU Platform found 80% match with no training data, orders of magnitude better than contemporary Language Models. A leading Language Model with no task specific training found only 20% of the tags on the same data.

FIG. 16 illustrate the consolidated meaning representation graph generated by the NLU Platform in more detail. It shows meaning representation from three content items which are intelligently aggregated by the NLU Platform to generate a consolidated meaning representation graph shown in FIG. 17. The Figure does not display each of the three meaning representation graphs for brevity. FIG. 17 also illustrates the use of global knowledge from the Global Knowledge Store. This is evident in how Biden's immigration policy' is related to Siden's Executive Order on Public Charge Rule'.

FIG. 17 illustrates the structure of global knowledge input which can be used by the NLU Platform 200 in its processing. The format of the input is flexible and reflects relationships between any pair of concepts. The Relation column reflects the rhetorical relation type which is from a set of extensible relationship types. Changing relationship types does not require any programming and is governed by data integrity principles like orphan control. Cue phrases with direction (before or after) can be associated with that relationship. The Sense column reflects the sense in which the concepts are being referred to in the specified relationship. Sense is an extensible attribute. The NLU Platform 200's sense list for any concept (or word) can be expanded without any programming. Global knowledge can be specified to be applicable across all Knowledge Collections, specific Knowledge Collections or domains or just for a content item. If needed, the NLU Platform 200 can also invoke an automated knowledge acquisition system or access a global knowledge store which contains global knowledge on concepts.

Similar to FIG. 17, FIG. 18 allows the NLU Platform Application 310 user to input sense disambiguation rules. These rules can be a combination of linguistic characteristics of the word, a set of words occurring before and after the word in any sentence containing the word, part of speech tags for those words, cue phrases, and substance words for example a proper noun or an unambiguous noun. The NLU Platform 200 can also invoke an automated classifier if one exists to disambiguate sense. Such an automated classifier will automatically identify the sense in which a word is being used in a specific instance. As in the case of global knowledge, scope refers to how broadly the rule applied—all Knowledge Collections, specific Knowledge Collections or domains or just for a document.

In another embodiment, an exemplary method and use for the automated, natural language understanding tasks performed by the NLU Platform of the invention in agile continuous learning processes is described below;

Agile continuous learning platform (ACL Platform):

An effective framework for agile continuous learning platform include processes that provides the user with the following core element requisites:
1. The ability for learners to self-learn from a continuously refreshed knowledge portal, with or without assessment and micro-credentials
2. The ability to rapidly assemble, organize and synthesize new learning content from within and outside an institution's content library and keep it constantly updated (Rapid Learning Content Assembly).
3. Automated, explainable assessment of open responses scored against a rubric (Scalable Open Text Response Assessment.
4. Skills based, career and demand driven personalization of the learning journey.

The ACL platform application of the automated NLU Platform of the invention automatically creates continuous knowledge collections on any topic in its Continuous Knowledge Portal as also illustrated in FIGS. 13-14.

The ACL Platform application of the invention comprises one or more Portals that facilitates self-learning on a collection of topics. For example, a third party institution can provide the Portal to its lifelong learners by coupling the Portal with assessments and credentials. Faculty or course designers can manage the content which learners have access to. Faculty can annotate the ACL content as they see fit to impart their knowledge and pedagogy.

The ACL Platform Portal can also be integrated with the institution's learning delivery infrastructure and learning management systems.

Rapid Learning Content Assembly (Course Authoring)

Figure 19:
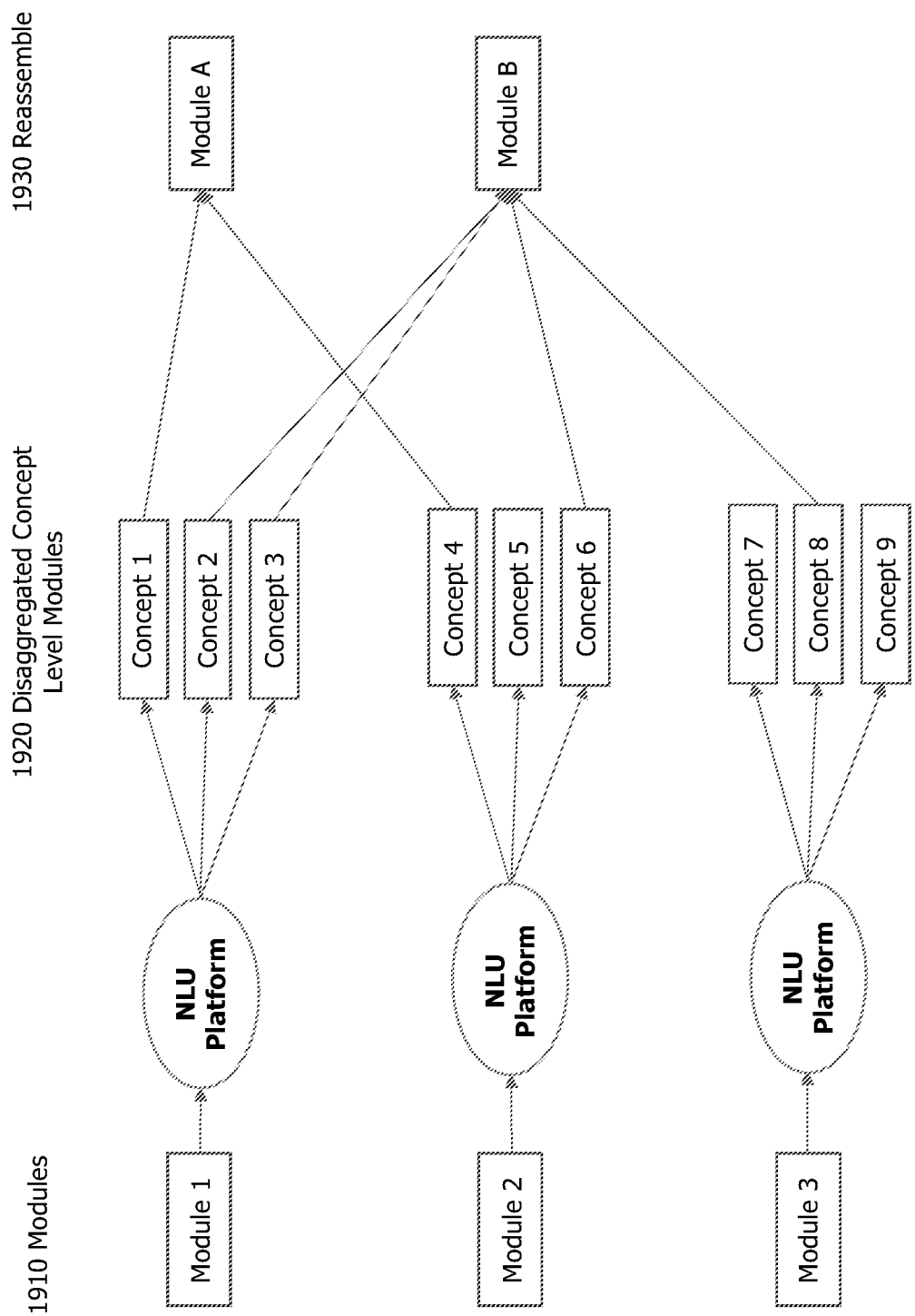
FIG. 19 illustrates the ACL Platform I Learning Content Authoring/Assembly Component which enables any institution to rapidly assemble learning content on a new topic or topics related to a specific skill.

The ACL Platform I Learning Content Authoring/Assembly Component (FIG. 19) enables any institution to rapidly assemble learning content on a new topic or topics related to a specific skill. The ACL Platform uses its natural language understanding engine to disaggregate the content down to a concept level. It can ingest existing learning content in all formats. It can also augment the content with new content from external repositories like other private learning content collections or the public internet.

At a major global educational institution, Gyan is being used to rapidly decompose massive amounts of existing content to granular levels of learning units and supplemented with external content in order to enable the creation of new learning modules on demand. The institution can mix and match its granular learning units to meet new learning needs. The content can be personalized to individual learner as needed. Personalization can be based on the individual learner's learning preferences.

The platform also has the intelligence to build the learning outline, create assessments based on a desired scope, and integrate the final course or learning content with popular learning management solutions (LMS).

Scalable Open Text Response Assessment

Human grading of essays and open text responses [ORA] is time consuming and subject to inconsistencies and biases. Extant research on automated grading of essays [AES], has been criticized for lack of context awareness, the need for large volume of training data, data driven biases and their black box nature. Further, in online courses like MOOCs, the common practice is to use peer grading. Peer grading has serious drawbacks as a grading method, not the least of which is a natural agency for grade inflation. The ACL Platform of the invention addresses these challenges effectively. ACL Platform evaluates the essay or ORA in its context, gathers intelligence from a sparse data set of labeled essays, is transparent in its reasoning or logic and is tractable so it can be improved in an understandable manner. Further, the ACL Platform can be configured rapidly to reflect course-specific requirements.

A prominent, globally respected higher educational institution currently uses peer grading in its online courses for open text response assessment. An assignment from a course that was already graded was selected for evaluation of the ACL Platform of the invention. For the chosen assignment, the peer graders had given each other perfect scores.

The ACL Platform was configured with the rubric the professor had specified. After ACL Platform was configured, all of the submitted assignments of 10 students were assessed through it.

Three teaching assistants (TAs) were requested to grade the same essays manually for obtaining and comparing the output grading provided by the ACL Platform against a human baseline. FIG. 20 presents the results of the pilot. As seen, the peer grades were perfect scores for all 10 students. The TAs had a wide dispersion for the same essay. For each of the ACL Platform assessments, a detailed reasoning report was provided to the professor/institution explaining how the ACL Platform arrived at the final score/grade. In all the cases, the professor and TAs were in agreement with ACL Platform's assessment.

Personalized Learning Pathways

There is a growing willingness among employers to hire people who have the necessary skills for the jobs disregarding the traditional 4-year college degree. Leading employers are working with educational institutions to create learning programs to develop the talent and workforce they need.

The ACL Platform enables the automated creation of personalized learning pathways for individuals. This is being used by a global higher educational institution and a startup focused on career guidance for unemployed adults.

The process of determining personalized learning pathways starts with the input by the individual user by uploading their resume or profile. The ACL Platform extracts the individual's skills from the resume. The ACL Platform processes various sections in the resume—education, experience, purpose, and skills if they are explicitly mentioned. In addition to skills, the ACL Platform also determines a proficiency level for each of the skills. The ACL Platform can be integrated with any skills taxonomy, for example, ONET, EMSI Burning Glass or a proprietary taxonomy, that is specific to the recruiting employer.

The ACL Platform identifies the skill gap between the person's skills as indicated in the resume and a desired occupation. The skills extracted from the resume are normalized by the ACL Platform using a chosen skills taxonomy like ONET. The normalized skills are then compared to a desired occupation to identify the person's skill gap for that specific occupation.

Document Discoverability Tag

Improving discoverability of content offered by an institution typically requires the manual creation of tags and/or a manually created content organization structure (e.g. a hierarchical set of topics). Staying ahead of this tagging process as new content arrives is equally challenging. Automatically generating high quality tags would not only make this process much more efficient, it would also make tagging content at a much larger scale feasible.

The ACL Platform of the invention was evaluated in a pilot project which required the Platform to generate tags that best describe a document to maximize discoverability in search by customers/prospects.

As shown in FIG. 15, for a sample size constituting 7 articles, the ACL Platform found 80% match with its tags with no training data, which was orders of magnitude better than contemporary AI based Machine Learning systems (LMs). A currently used leading LM with no task specific training found only 20% of the tags accurately on the same data compared to the ACL Platform application of the invention.

In conclusion, the present invention is directed to a system and method for natural language understanding (comprehension) the system includes a processor configured to automatically carry out a task of human-analogous natural language understanding of natural language content from one or more text documents, the system has a natural language understanding engine which creates a machine representation of the meaning of a document using a compositional language model. The engine creates its machine meaning representation for a document by decomposing the entire document into its compositional structure to reflect multiple layers of meaning, and doing so in an invertible manner by parsing the document according to a discourse model identified for the document, identifying the main idea of the document, and identifying the start of new ideas in the document, decomposing the document into sub-documents by ideas, and creating meaning representation for the whole document by decomposing the sub-documents into their compositional elements; the computing system may include one or more virtual or dedicated servers or similar computing devices and programmed with executable instructions.

The method of the invention automatically performs the function of human-analogous natural language understanding of natural language content from one or more text documents, the method by generating a machine representation of the meaning of a document using a compositional language model; then generating the machine meaning representation for a document by decomposing the entire document into its compositional structure to reflect multiple layers of meaning, and doing so in an invertible manner by parsing the document according to a discourse model identified for the document, identifying the main idea of the document, and identifying the start of new ideas in the document, decomposing the document into sub-documents by ideas, and creating meaning representation for the whole document by decomposing the sub-documents into their compositional elements.

The compositional language model does not utilize statistical machine learning or statistically derived distributional semantics like word embeddings, for creating its meaning representation. The natural language understanding engine utilizes computational linguistics, compositionality and rhetorical structure in language and can process one or more documents without any training or training data. The natural language understanding engine works entirely in natural language and does not convert any part of the document into real valued vector encodings.

The invention claimed is:

1. A natural language understanding system comprising at least one processor configured to automatically carry out a task of human-analogous natural language understanding of natural language content from one or more text documents, the system comprising:
   a computer system hosting a natural language understanding engine which creates a machine representation of the meaning of a document using a compositional language model;
   the engine creating its machine meaning representation for a document by decomposing the entire document into its compositional structure to reflect multiple layers of meaning, and doing so in an invertible manner;
   the engine decomposing the document into its compositional structure by parsing the document according to a discourse model identified for the document, identifying the main idea of the document, and identifying the start of new ideas in the document, decomposing the document into sub-documents by ideas, and creating meaning representation for the entire document by decomposing the subdocuments into their compositional elements; and the computing system comprising one or more virtual or dedicated servers or similar computing devices and programmed with executable instructions.

2. The system of claim 1, where the compositional language model does not utilize statistical machine learning or statistically derived distributional semantics like word embeddings, for creating its meaning representation graph.

3. The system of claim 1, where the natural language understanding engine utilizes computational linguistics, compositionality and rhetorical structure in language and processes one or more documents without any training or training data.

4. The system of claim 1, where the natural language understanding engine works entirely in natural language and does not convert any part of the document into real valued vector encodings.

5. The system of claim 1, where a new discourse model is created and integrated without any programming.

6. The system of claim 1, where the main idea of the document is determined based on concept importance using a combination of linguistic and rhetorical structure, attributes and discourse model.

7. The system of claim 1, where the start of a new idea is determined based on determining the nature of relationship between each successive compositional element including a paragraph, a sentence, and a clause based on linguistic attributes and nature of rhetorical expressions linking the compositional elements including a plurality of linguistic rules, rhetorical relations and co-referential relationships.

8. The system of claim 7, where the co-referential relationships between concepts in two sentences is the use of the exact same concept or a pronomical or a pragmatic reference to the concept contained in an external global knowledge store.

9. The system of claim 1, where decomposing the sub-documents includes at the first level, identifying sentence level compositional elements and the relationships amongst them that make up the sub-documents using linguistic attributes and the nature of the linguistic relationship of the compositional elements to the primary sentence of the sub-document and each other.

10. The system of claim 9, where decomposing the sub-documents at the next level, includes identifying within sentence level compositional elements and the nature of the rhetorical and linguistic relationships amongst them using linguistic and rhetorical attributes and rules.

11. The system of claim 10, where the decomposing the sub-documents continues until every single compositional unit including at the word level is part of a meaning representation graph created for the entire document.

12. The system of claim 9, where new rules are added to detect relationships between and among compositional elements without any programming.

13. The system of claim 1, where the meaning representation is in the form of a meaning representation graph comprising the decomposed compositional elements which is queried by concept, surface form of the rhetorical expression or abstract rhetorical relationship types.

14. The system of claim 13, where the meaning representation graph is invertible back into the complete document.

15. The system of claim 13, where surface form of the rhetorical expression or abstract rhetorical relationship types is a map between rhetorical expressions and abstract rhetorical relations that is configurable and is a function of cue words, cue phrases and linguistic attributes of the discourse including parts of speech, sentence type, and co-referential relationships.

16. The system of claim 1, where the decomposing the compositional structure includes establishing co-referential relationships between words and the detection of such co-referential relationships are improved by external knowledge stored in a global knowledge store.

17. The system of claim 16, where the global knowledge store stores knowledge at a sense level for each concept and continuously improved without any programming.

18. The system of claim 16, where the global knowledge store stores knowledge at a sense level for each concept.

19. The system of claim 1, where the document is a text document of data formats comprising text, html, Docx, PDF, Pptx, eBook and audio and video data which are transcribed into text.

20. The system of claim 19, where the document is not grammatically complete including cryptic social media messages.

21. The system of claim 1, where the engine identifies rhetorical phrases between sentences and within each sentence among compositional units including between subject and object, and also maps such identified rhetorical phrases to a set of normalized rhetorical relations.

22. The system of claim 1, wherein the engine creates an expandable multi-level summary of a document corresponding to a multi-level meaning representation graph.

23. The system of claim 1, wherein the engine creates an expandable multi-level summary of a document according to user preferences expressed as rules operating on rhetorical relations identified in the document.

24. The system of claim 1, wherein the engine processes one or a plurality of documents without requiring any training or training document set.

25. The system of claim 24, where the engine creates a combined meaning representation graph for an entire collection of documents by aggregating meaning representation graphs for each of the documents after removing redundant concepts across meaning representation graphs at the document level.

26. The system of claim 24, where the engine creates an aggregate summary for an entire collection of documents by aggregating summaries for each of the documents and removing redundant content.

27. A system for creating a knowledge collection of relevant documents using the meaning representation of system of claim 1.

28. The system of claim 27, where the knowledge collection is based on a query using internet search engines, private document collections and sources or a combination thereof.

29. The system of claim 27, where the engine organizes the collection of relevant documents into a pre-determined set of sub-topics by determining the most relevant match for each document; and where a pre-determined set of sub-topics is not available, the engine surfaces an intrinsic set of topics from the collection of relevant documents using the meaning representation of the system for each of the documents in the collection.

30. The system of claim 29, where the pre-determined set of sub-topics is an intrinsic set of sub-topics that is determined as the most representative ideas across the collection of documents by aggregating the ideas in each of the documents.

31. The system of claim 30, where the process of determining the most representative ideas across the collection of documents integrates knowledge from the global knowledge store to enable the engine to recognize relationships across ideas not explicitly present in the documents, uses linguistic characteristics including its role in the documents it is found in.

32. The system of claim 29, where a degree of relevance of each article in the collection of documents to each of the pre-defined sub-topics is determined using a combination of concept importance, sentence importance and context strength.

33. The system of claim 29, where the engine creates an aggregate summary for each of the sub-topics by aggregating summaries of the documents classified in that sub-topic.

34. A method of automatically performing the function of human-analogous natural language understanding of natural language content from one or more text documents, the method comprising:
generating a machine representation of the meaning of a document using a compositional language model;
generating the machine meaning representation for a document by decomposing the entire document into its compositional structure to reflect multiple layers of meaning, and doing so in an invertible manner; and
decomposing the document into its compositional structure by parsing the document according to a discourse model identified for the document, identifying the main idea of the document, and identifying the start of new ideas in the document, decomposing the document into sub-documents by ideas, and creating meaning representation for the entire document by decomposing the subdocuments into their compositional elements.

35. The method of claim 34, where the compositional language model does not utilize statistical machine learning or statistically derived distributional semantics like word embeddings, for creating its a meaning representation graph.

36. The method of claim 34, where the compositional language model utilizes computational linguistics and rhetorical structure in language and processes one or more documents without any training or training data.

37. The method of claim 34, where the method works entirely in natural language and does not convert any part of the document into real valued vector encodings.

38. The method of claim 34, where a new discourse model is created and integrated without any programming.

39. The method of claim 34, where the main idea of the document is determined based on concept importance using a combination of linguistic and rhetorical structure, attributes and discourse model.

40. The method of claim 34, where the start of a new idea is determined based on determining the nature of relationship between each successive compositional element including a paragraph, a sentence, and a clause based on linguistic attributes and nature of rhetorical expressions linking the compositional elements including a plurality of linguistic rules, rhetorical relations and co-referential relationships.

41. The method of claim 34, where decomposing the sub-documents includes at the first level, identifying sentence level compositional elements and the relationships amongst them that make up the sub-documents using linguistic attributes and the nature of the linguistic relationship of the compositional elements to the primary sentence of the sub-documents and each other.

42. The method of claim 41, where decomposing the sub-documents at the next level, includes identifying within sentence level compositional elements and the nature of the rhetorical and linguistic relationships amongst them using linguistic and rhetorical attributes and rules.

43. The method of claim 42, where the decomposition of the sub-documents continues until every single compositional unit including at the word level is part of the meaning representation graph.

44. The method of claim 41, where new rules can be added to detect relationships between and among compositional elements without any programming.

45. The method of claim 34, where the meaning representation is in the form of a multi-layered graph comprising the decomposed compositional elements which can be queried by concept, surface form of the rhetorical expression or abstract rhetorical relationship types.

46. The method of claim 45, where the surface form of the rhetorical expression or abstract rhetorical relationship types is a map between rhetorical expressions and abstract rhetorical relations are configurable and can be a function of cue words, cue phrases and linguistic attributes of the discourse including parts of speech, sentence type, and co-referential relationships.

47. The method of claim 34, where decomposing the compositional structure includes establishing co-referential relationships between words and the detection of such co-referential relationships are improved by external knowledge stored in a global knowledge store.

48. The method of claim 47, where the global knowledge store can store knowledge at a sense level for each concept and continuously improved without any programming.

49. The method of claim 34, where a document is not grammatically complete including cryptic social media messages.

50. The method of claim 34, wherein the method creates an expandable multi-level summary of a document corresponding to a multi-level meaning representation graph.

51. The method of claim 50, wherein the method creates an expandable multi-level summary of a document according to user preferences expressed as rules operating on the rhetorical relations identified in the document.

52. The method of claim 34, wherein the method processes one or a plurality of documents without requiring any training or training document set.

53. A method for creating a knowledge collection of relevant documents using the meaning representation of the method of claim 34.

54. The method of claim 53, where the knowledge collection is based on a query using internet search engines, private document collections and sources or a combination.

55. The method of claim 53, where the method organizes the knowledge collection of relevant documents into a pre-determined set of sub-topics by determining the most relevant match for each document; and where a pre-determined set of sub-topics is not available, the method surfacing an intrinsic set of topics from the collection of relevant documents for each of the documents in the collection.

56. The method of claim 55, where the intrinsic set of sub-topics is determined as the most representative ideas across the collection of documents by aggregating the ideas in each of the document.

57. The method of claim 56, where the process of determining the most representative ideas across the document collection also integrates knowledge from the global knowledge store to enable the method to recognize relationships across ideas not explicitly present in the documents.

58. The method of claim 55, where the degree of relevance of each document in the document collection to each of the pre-defined sub-topics is determined using a combination of concept importance, sentence importance and context strength.

59. The method of claim 34, where the method creates a combined meaning representation graph for an entire collection of documents by aggregating meaning representation graphs for each of the documents after removing redundant concepts across meaning representation graphs at the document level.

60. The method of claim 34, where the method creates an aggregate summary for an entire collection of documents by aggregating summaries for each of the documents and removing redundant content.

\* \* \* \* \*